United States Patent [19]

Monsarrat et al.

(10) Patent No.: US 11,501,497 B1
(45) Date of Patent: Nov. 15, 2022

(54) PLACING VIRTUAL LOCATION-BASED EXPERIENCES INTO A REAL-WORLD SPACE WHERE THEY DON'T FIT

(71) Applicant: Monsarrat, Inc., Santa Monica, CA (US)

(72) Inventors: Jonathan Monsarrat, Santa Monica, CA (US); Justin Sindecuse-Hayden, Weldon Spring, MO (US)

(73) Assignee: Monsarrat, Inc., Santa Monica, CA (US)

( * ) Notice: Subject to any disclaimer, the term of this patent is extended or adjusted under 35 U.S.C. 154(b) by 0 days.

(21) Appl. No.: 17/537,759

(22) Filed: Nov. 30, 2021

Related U.S. Application Data

(60) Provisional application No. 63/259,899, filed on Jun. 28, 2021.

(51) Int. Cl.
*G06F 3/04815* (2022.01)
*G06T 19/20* (2011.01)
*G06T 19/00* (2011.01)

(52) U.S. Cl.
CPC ........ *G06T 19/003* (2013.01); *G06F 3/04815* (2013.01); *G06T 19/20* (2013.01)

(58) Field of Classification Search
CPC .... G06T 19/003; G06T 19/20; G06F 3/04815
See application file for complete search history.

(56) References Cited

U.S. PATENT DOCUMENTS

| | | | |
|---|---|---|---|
| 2003/0235337 A1 | 12/2003 | Paragios et al. | |
| 2005/0264566 A1* | 12/2005 | Sommers | G06T 17/05 345/423 |
| 2009/0254843 A1* | 10/2009 | Van Wie | H04N 7/157 707/999.005 |
| 2010/0329571 A1 | 12/2010 | Subramanian et al. | |
| 2011/0187638 A1* | 8/2011 | Chao | G06F 3/01 345/156 |
| 2012/0066306 A1* | 3/2012 | Leacock | H04L 67/24 709/204 |
| 2012/0069051 A1 | 3/2012 | Hagbi et al. | |
| 2012/0081369 A1* | 4/2012 | Li | G06T 19/003 345/426 |
| 2013/0050260 A1 | 2/2013 | Reitan | |
| 2014/0280506 A1* | 9/2014 | Cronin | H04L 67/02 709/203 |

(Continued)

FOREIGN PATENT DOCUMENTS

WO  2009027088 A1  3/2009

*Primary Examiner* — Jitesh Patel

(74) *Attorney, Agent, or Firm* — David J. Thibodeau, Jr.; VLP Law Group LLP

(57) ABSTRACT

Techniques for creating a virtual space correlated with the geometry of a real space, to enable a user to experience the virtual space by moving virtually in the real space. Multiple users, each in a different real space, can share a single generated virtual space. If the real space is too small to fit the virtual space, the virtual space is laid out hanging over the edge of the real space. When the user reaches this edge, the virtual space is flipped over and re-correlated with the real space, so that by turning around in the real space, the may continue straight ahead in the virtual space. Also described are other ways a large virtual space can be placed and flipped over a smaller real space, recursively, for example to reduce the user's overall walking.

9 Claims, 19 Drawing Sheets

101
A Real Space in the Real-World
FIG. 1-1

102
Add a Virtual Space Experience
FIG. 1-2

103
Which May Contain Virtual Locations
FIG. 1-3

104
A User with a Device
FIG. 1-4

105
Travels Across the Real Space
FIG. 1-5

106
To Move in the Virtual Space
FIG. 1-6

(56) References Cited

U.S. PATENT DOCUMENTS

| | | | | |
|---|---|---|---|---|
| 2014/0289648 A1* | 9/2014 | Rowe | ................... | A63F 13/577 |
| | | | | 715/757 |
| 2016/0151710 A1* | 6/2016 | Hall | ...................... | H04W 4/50 |
| | | | | 463/42 |
| 2016/0196596 A1* | 7/2016 | Van Wie | ............ | H04L 12/1813 |
| | | | | 705/26.41 |
| 2016/0197862 A1* | 7/2016 | Moyers | ................. | H04L 51/18 |
| | | | | 709/204 |
| 2017/0046882 A1* | 2/2017 | Lane | ..................... | A63F 13/57 |
| 2018/0075652 A1* | 3/2018 | Kim | ..................... | G06T 3/0062 |
| 2018/0077209 A1* | 3/2018 | So | ........................ | G06Q 30/02 |
| 2018/0308377 A1* | 10/2018 | Pena-Rios | ............... | G09B 5/12 |
| 2019/0051051 A1* | 2/2019 | Kaufman | .......... | G02B 27/0172 |
| 2019/0180509 A1* | 6/2019 | Laaksonen | ............ | H04M 1/724 |
| 2020/0294311 A1* | 9/2020 | Holz | ..................... | G06V 20/20 |
| 2020/0312031 A1* | 10/2020 | Huang | ................. | G06T 19/006 |
| 2020/0406143 A1* | 12/2020 | Nakamura | ............. | A63F 13/65 |
| 2021/0142564 A1* | 5/2021 | Impas | ................. | G06F 3/0482 |

\* cited by examiner

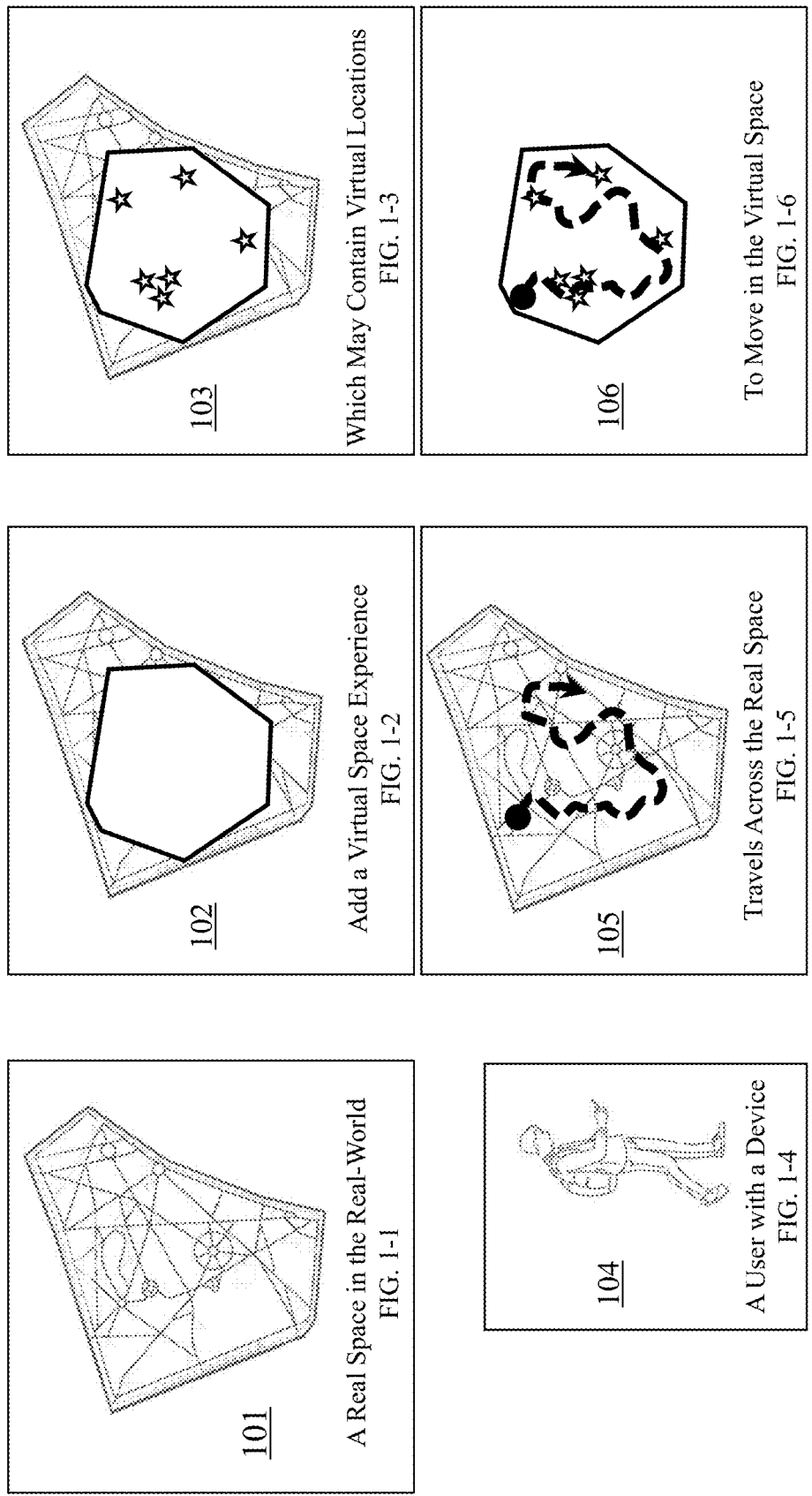

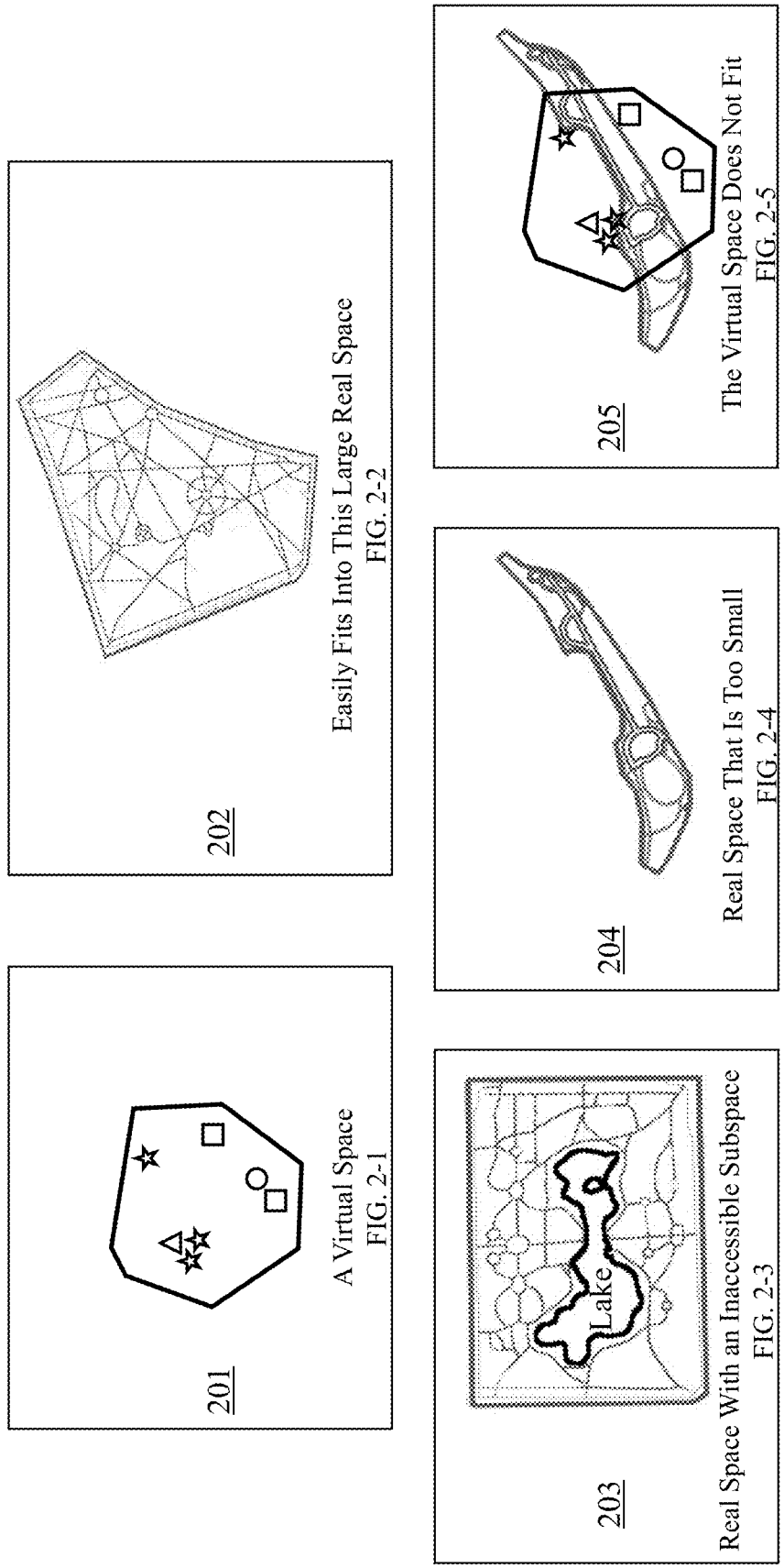

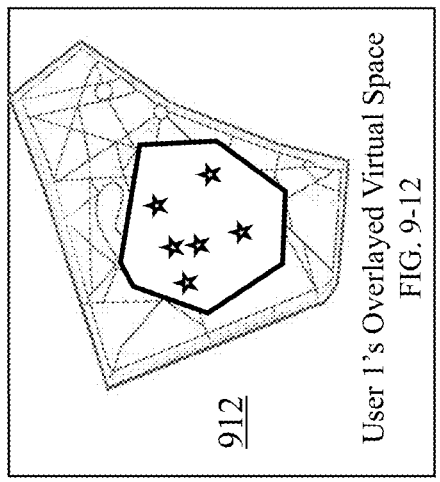
912
User 1's Overlayed Virtual Space
FIG. 9-12
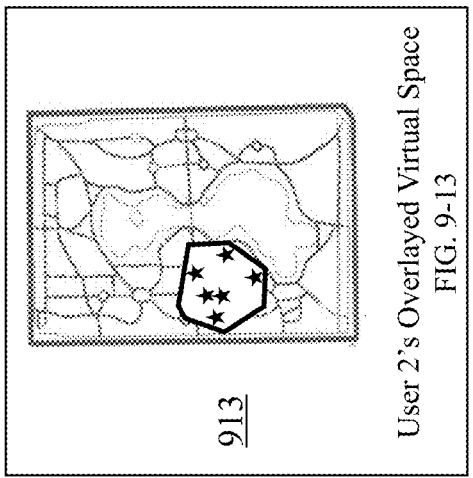
913
User 2's Overlayed Virtual Space
FIG. 9-13
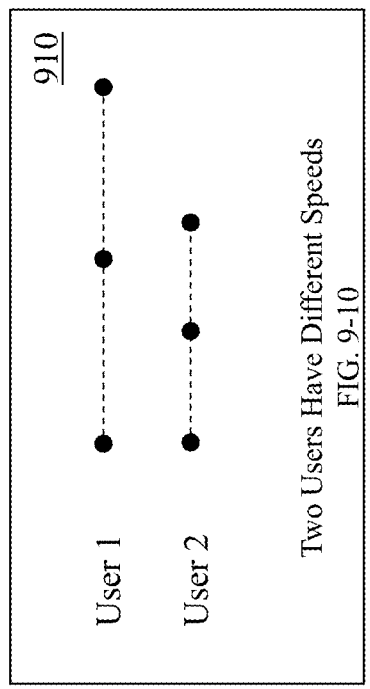
910
User 1
User 2
Two Users Have Different Speeds
FIG. 9-10
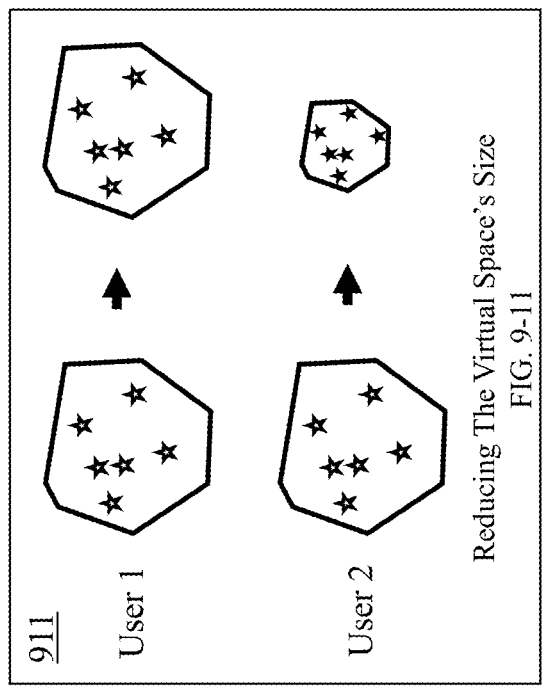
911
User 1
User 2
Reducing The Virtual Space's Size
FIG. 9-11
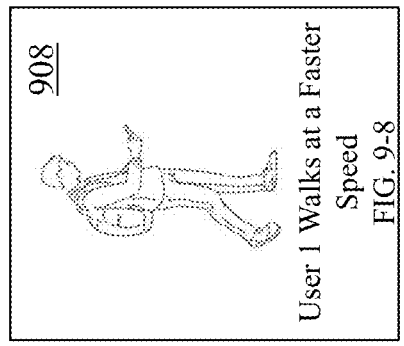
908
User 1 Walks at a Faster Speed
FIG. 9-8
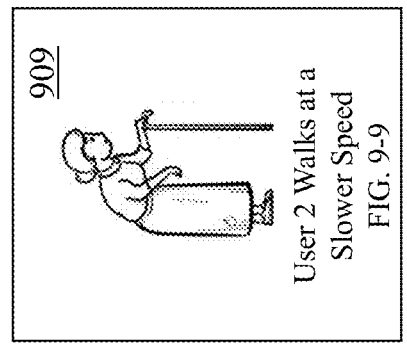
909
User 2 Walks at a Slower Speed
FIG. 9-9
FIG. 9b

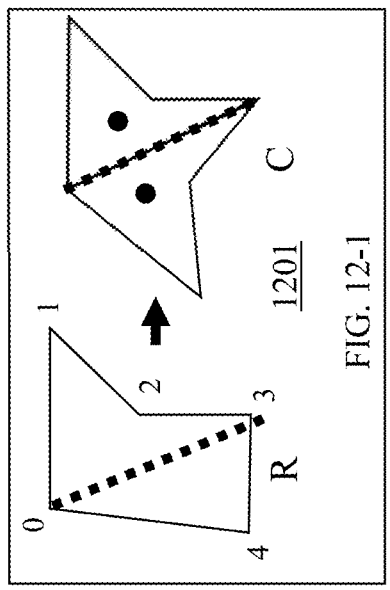
FIG. 12-1
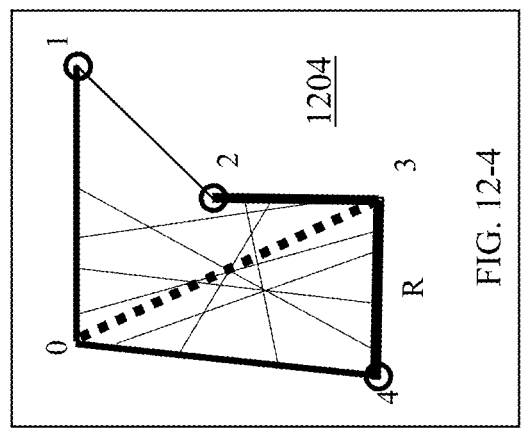
FIG. 12-4
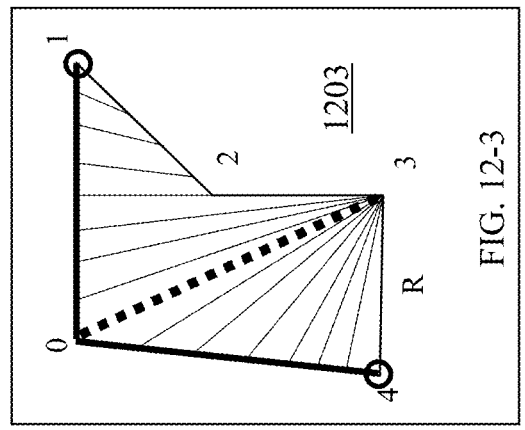
FIG. 12-3
FIG. 12
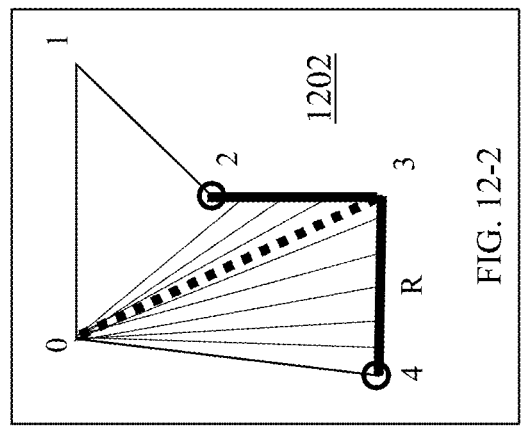
FIG. 12-2

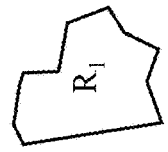
1301
Real Space
FIG. 13-1
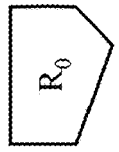
1302
Real Space
FIG. 13-2
1303
$V_{AREA} = 300m^2$
The Virtual Space Must Have a Given Area
FIG. 13-3
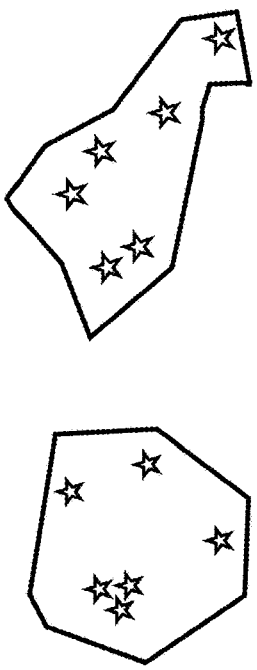
1304
A Virtual Space of Any Shape is Acceptable if It Has the Given Area $V_{AREA}$
FIG. 13-4
FIG. 13

Example Flip Lines for $CS_0[0]$ and $CS_0[1]$

PLACING VIRTUAL LOCATION-BASED EXPERIENCES INTO A REAL-WORLD SPACE WHERE THEY DON'T FIT

BACKGROUND

Location-based entertainment (LBE) is big business. Disney's theme parks earn $26B per year with 175 MM visitors, and Universal Studios earn $6B with 50 MM visitors. And there are many other types of physical attractions. However, many people wish to experience such entertainment without taking a long time to travel physically to an attraction.

Virtual LBEs are a growing solution to this problem, a market forecast to grow to $12B by 2023. With a virtual LBE, a virtual experience is a two-dimensional virtual space laid out in a convenient real world space that a user does have the time to visit. The user travels to the real world location, and then can access the virtual experience through a portable electronic device that is capable of knowing the user's physical position, such as a mobile phone or tablet. Every step that the user takes in the real world space, as tracked by the device, registers a step in the correlated virtual LBE space.

Unfortunately, virtual LBEs do have challenges. Their size is restricted to the size of the physical space conveniently accessible by the user. If the user tries to experience a large virtual theme park in a small location such as a city neighborhood park, the LBE doesn't fit.

Additionally, if two or more people wish to experience a virtual LBE together, they would have to physically meet. This is inconvenient if they live in different cities or in different countries with a big ocean in-between. Allowing users to access the same virtual LBE from different locations, whatever the size and shape of each user's conveniently accessible physical location, would be a convenience to users and help the virtual LBE industry grow.

SUMMARY

In an embodiment, we are given one or more users who each have a mobile device, tablet, personal computer, or some other data processor, which has a way of determining its physical location, for example through a GPS receiver. With such as device, a user can access virtual experiences contained inside of a virtual space. The user would only need to move physically through the real space, as tracked by the device, to move in a correlated way in the virtual space, and thus be able to access any part of the virtual experience.

In an embodiment, for each user we are also given the geometric boundary coordinates of a physical space that is convenient for the user to visit in person.

Finally, we are given criteria for constructing the virtual space, which are not limited to but may include:
   specifying a desired shape and size, or
   permitting any shape so long as its total area falls within a given tager range The task for this embodiment is then to constructing a single virtual space and correlate it with and within each user's respective physical space, in such a way that is optimizes the given criteria.

In an embodiment, a candidate virtual space is initialized to simply be the same as the user's physical space. But then the candidate virtual space can be extended by a "flip line." The virtual space is cleaved by the flip line into two pieces.

The user's virtual location begins in the first piece of the virtual space, which is mapped onto the physical space. To access the second part of the virtual space, the user walks physically up to the flip line, approaching along a given direction of travel both physically and virtually.

In the physical space the user can then turn around, and continues away, as if "reflected" off of the flip line. But in the virtual space, the user's virtual direction of motion continues as if unchanged. The user continues into the second piece of the virtual space, which has been mirrored and then mapped back onto the physical space.

Even though the two pieces of the virtual space overlap in the physical space where they are correlated, the user is only ever in one piece at a time. The user switches between the two pieces of the virtual space at the flip line, as though "going through the looking glass".

Breaking the virtual space into two pieces allows a large virtual space of twice the size to be correlated with a small physical space. However, a doubling of the physical space may not be sufficient or may not satisfy some other criteria for the construction of the desired virtual space.

Therefore, an embodiment identifies a universe of candidate virtual spaces which are constructed by adding a single flip line to a physical space, thus extending it. These candidate virtual spaces may then be expanded yet again with additional flip lines.

This universe of candidate virtual spaces is explored recursively, with each graded using a scoring system that may try to optimize:
   minimizing the travel time needed to explore the entire space, in how it's laid out physically
   maximizing the portion of the virtual space that can be accessed without crossing flip lines
   minimizing the total number of flip lines in the solution The solutions get prioritized based on their grades, and the best one gets tested against the criteria for the desired virtual space. If the criteria are not met, the method iterates to the next best flip line, or recurses in some manner of breadth-first or depth-first search.

Three algorithms are presented. In the first, the desired virtual space is required to have a fixed shape and fixed size. In the second, the desired virtual space may have any shape, but must have a given total area.

In the third, the desired two-dimensional virtual space must be corrected with a one-dimensional physical space such as a long, straight beach boardwalk, or a path along a series city of sidewalks that may not be straight. A user that is travelling linearly is able to move around the virtual space in any direction by using their device to rotate the virtual space, such that their intended virtual destination is now in the direction of their intended physical destination.

Finally, a modification is given where a single virtual space presented to multiple users can be scaled larger or smaller with each user's physical space, to accommodate users who travel at different speeds.

BRIEF DESCRIPTION OF THE DRAWINGS

FIG. 2 shows how a large virtual LBE doesn't fit into a small real-world space.

FIG. 9b shows is a modification for when one user moves slower the other(s).

FIG. 12 shows how to optimize a proposed mirroring with slight variations.

FIG. 13 is Algorithm 2: creating a virtual space with a desired fixed size.

DETAILED DESCRIPTION

Figures 1, 15:
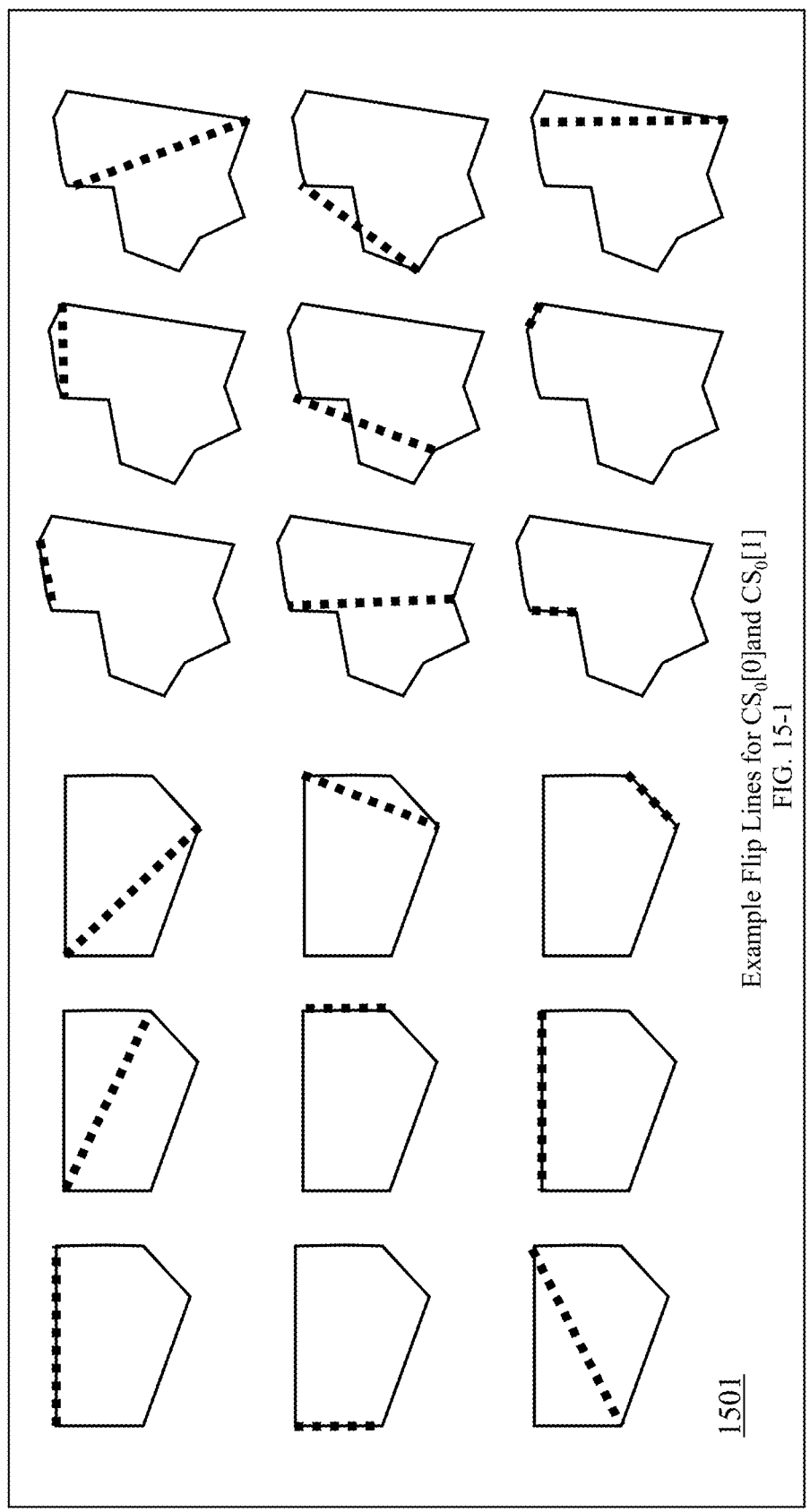
FIG. 1 shows how a virtual Location-Based Experience works.
FIG. 15 continues Algorithm 2, finding a universe of possible mirrorings.

A description of preferred embodiments follows.
Description of a Location-Based Experience The embodiments described herein assume the existence of a technology that provides virtual Location-Based Experiences (LBEs). FIG. 1 shows how a virtual LBE is created and experienced.

By some method, A Real Space 101 is identified in the real world, typically a physical space that a User 104 can walk within or otherwise travel through using some mode of transportation. Then a Virtual Space 102 is placed, by some method, within the Real Space 101. The Virtual Space 102 is a set of one or more polygons, with each polygon defined by having its vertices at map coordinates. Thus, there is a one-to-one mapping between the area of the Virtual Space 102 and the associated area of the Real-world Space 101.

The Virtual Space 102 may define the boundaries within which users are to have an experience, such as metal detecting or a game of hide and go seek. Optionally, the Virtual Space 102 may Contain Special Locations 103, which are map coordinates or smaller regions internal to the Virtual Space 102 that have additional virtual experiences, for example a scavenger hunt or Easter egg hunt where users must visit each of the Special Locations 103.

A User 104 uses a portable mobile device, tablet personal computer, or some other data processor to access the virtual experience. Optionally, a visual representation of the virtual environment is rendered on an output device, such as a computer monitor or smartphone screen 104.

When the User with a Device 104 physically walks or otherwise Travels Across the Real-world Space 105, his or her virtual location Moves Through the Virtual Space 106.
Challenges to Placing LBEs in Real-World Spaces FIG. 2 shows how trying to place a large virtual experience space into a small real-world space presents a problem.

Ideally, a given Virtual Space 201 Easily Fits Into the Given Real Space 202, if the Real Space 202 is larger than the Virtual Space 201.

In another example, Real Space 203 has a lake, which is an Inaccessible Subspace 203, because it would be unpleasant for users to swim the lake while holding their phone as part of a virtual LBE. There is no way to fit Virtual Space 201, at its proper size, into Real Space 203 while avoiding the lake.

And, in a final example, Real Space 204 is simply too small to contain the Virtual Space 201. No matter how the Virtual Space 201 is rotated or translated, it simply doesn't fit inside the Real Space 205. (Possibly as part of the input criteria, Virtual Space 201 could be flipped over, or scaled, but such freedoms are not permitted in this example.)

Figure 3:
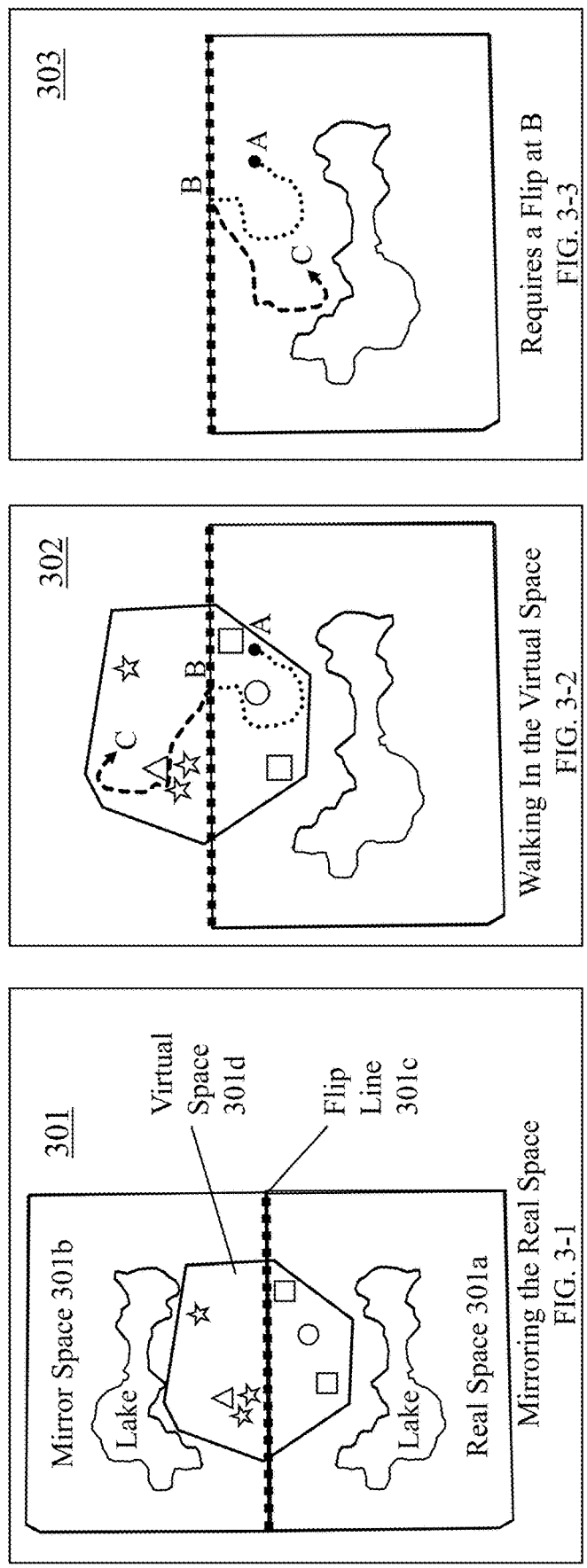
FIG. 3 shows how mirroring a real-world space virtually can double its size.

There is, however, a solution.
Mirror Spaces Effectively Enlarge Real-World Spaces FIG. 3 shows how a real-world space can be mirrored virtually, doubling the available room for a virtual space to be correlated to it.

In FIG. 301, note that the Real-world Space with a Lake 301a is at the bottom, its boundaries forming a polygon with an inaccessible lake in it 301a. This Polygon 301a has been reflected in a Mirror Image Space 301b. The Flip Line 301c is the axis around which the Real Space 301a has been inverted to form the Mirror Space 301b.

Together, the Real Space 301a and Mirror Space 301b form a "candidate virtual space", an area twice as large as the Real Space 301a that may fit the criteria by which a virtual space is to be constructed. This larger, combined space is large enough to fit in the Virtual Space 301d in-between the real lake and mirror lake.

At first glance, the Mirror Space 301b seems impossible. The city is not bringing in bulldozers and landscapers to carve out an entirely new park 301b in the real-world.

So, in 302, when the user walks from location A to location B, he or she remains within the Real Space 301a. That Real Space 301a is an area where it is possible to walk. However, in 302, when the user walks from location B to location C, that is outside of Real Space 301a. That is not possible.

However, Mirror Space 301b is virtual. It is mirrored and remapped to the Real Space 301a.

So instead, User 104's experience is this. User 104's mobile device, personal computer, or some other data processor indicates to User 104 to rotate at point B 303. Critically, this flip is a mirroring, not a rotation, of the top part of the Virtual Experience Space 301d. The user turns around 303, so that his or her journey from Point B to Point C remains within the Real Space 301a.

Notice that the route from B to C in 302 is a mirror of the route from B to C in 303. The entire virtual space has been mirrored and mapped back onto the real space.

Using a Flip Line 301c in this manner:

a) Is far more convenient to User 104 than giving up on the real space 301a as to small and traveling possibly miles elsewhere to a larger space.

b) Can be precomputed. It does not at all rely on the real-time status of the user's location, direction and speed of travel, or guessed destination.

c) Ensures that every adjacent point on either side of the Flip Line 301c in the Real Space 301a is also adjacent in the Virtual Space 301d. Thus, the user never takes one step in the Real Space 301a and has a jarring "teleport" to a faraway location in the Virtual Space 301d. This furthers the illusion that the Virtual Space 301d is a contiguous area that can be explored naturally.

How a Flip Line Works

Figure 4:
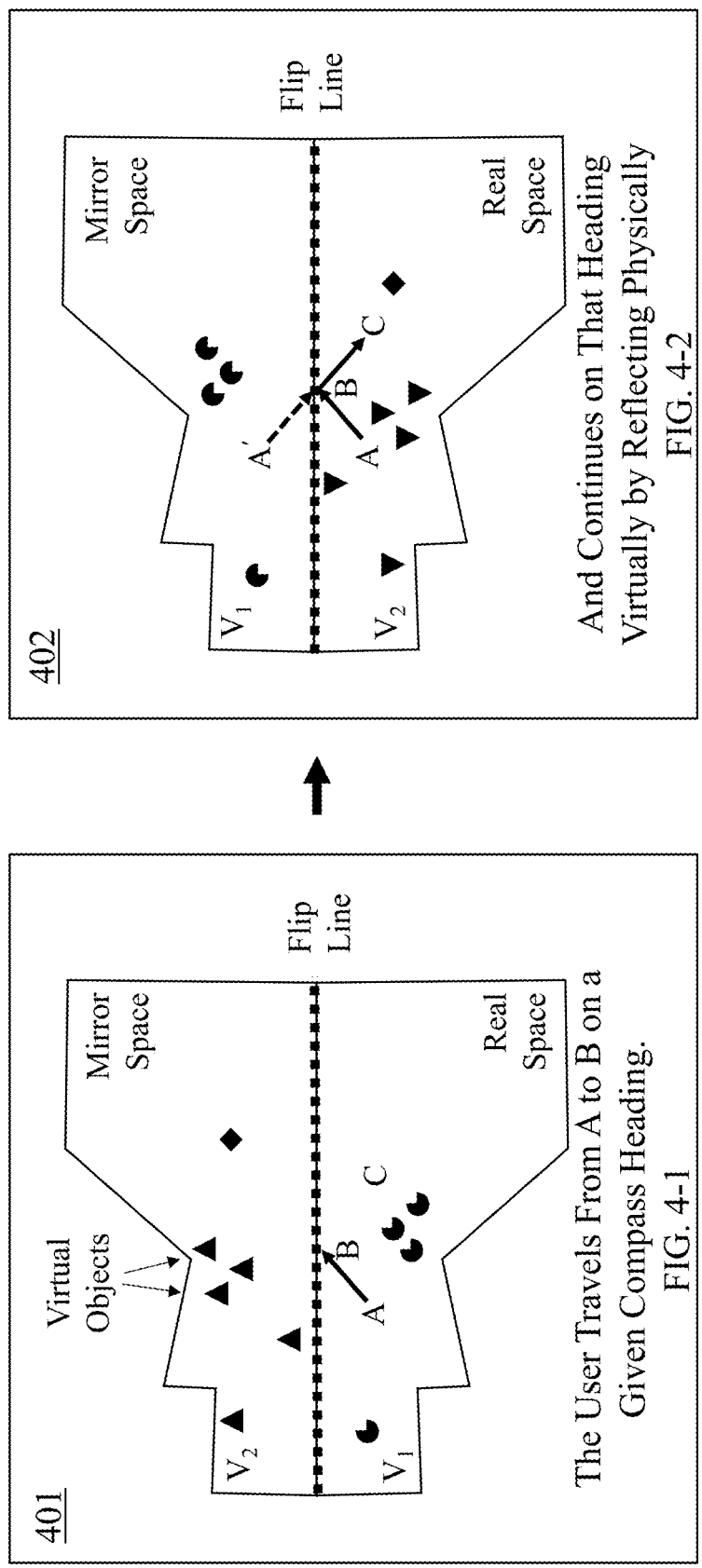
FIG. 4 explains how a "flip line" creates this mirroring and how it works.

FIG. 4 is a further explanation of what happens when a user crosses a flip line.

The user begins in the Real Space 401, with a location in both the Real Space 401 and the lower half of virtual space $V_1$ 401. The other half of the virtual space, $V_2$ 401, lays outside of Real Space 401, apparently inaccessible.

The points A, B, and C represent physical locations in $V_1$ and $V_2$ 401.

Optionally, the user's device may show the entire virtual space, including $V_2$. Starting at point A 401, the user decides to walk from $V_1$ into $V_2$, to access the to the diamond shape.

So, the user walks up to the flip line at point B 401, a physical movement on a set compass heading that creates movement of the user in the virtual space in the same direction.

In the physical world, when the user touches the flip line 401, $V_1$ and $V_2$ swap places 402. The virtual space $V_1$ that the user was just in 401 is now 402 in the Mirror Space 402 on the other side of the flip line, and the user 402 is now standing in virtual space $V_2$. Notice that the virtual objects have mirrored between 401 and 402.

The user may now travel to any part of $V_2$ but can no longer access anything in $V_1$ without touching the flip line again. Note the location A' which represents the virtual location that the user began at.

Wishing to continue "straight ahead" in the virtual space, and optionally seeing the new remapping of the virtual space on his or her device, the user moves at a new compass heading, from B to C, as though "reflected" off of the flip line. Or the user may choose to walk anywhere else, on any other compass heading inside $V_2$.

Notice that although the path A to B to C is bent line in the physical space, the path A' to B to C is a straight line in the virtual space.

An Extended Example of Mirror Spaces

Figure 5:
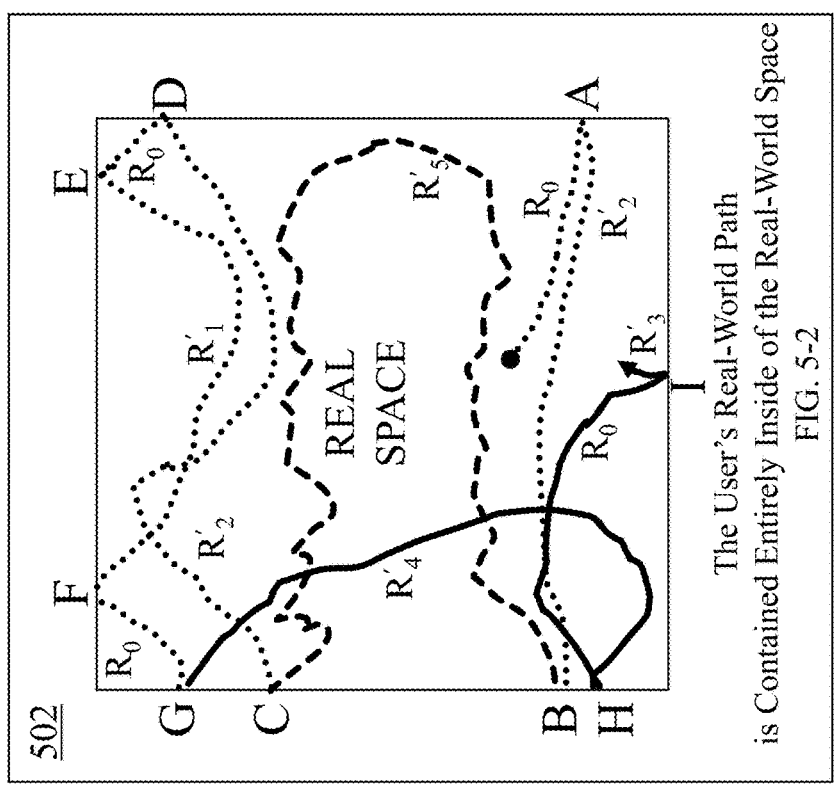
FIG. 5 is an extended example of how mirrored real-world spaces could work.
Figure 5:
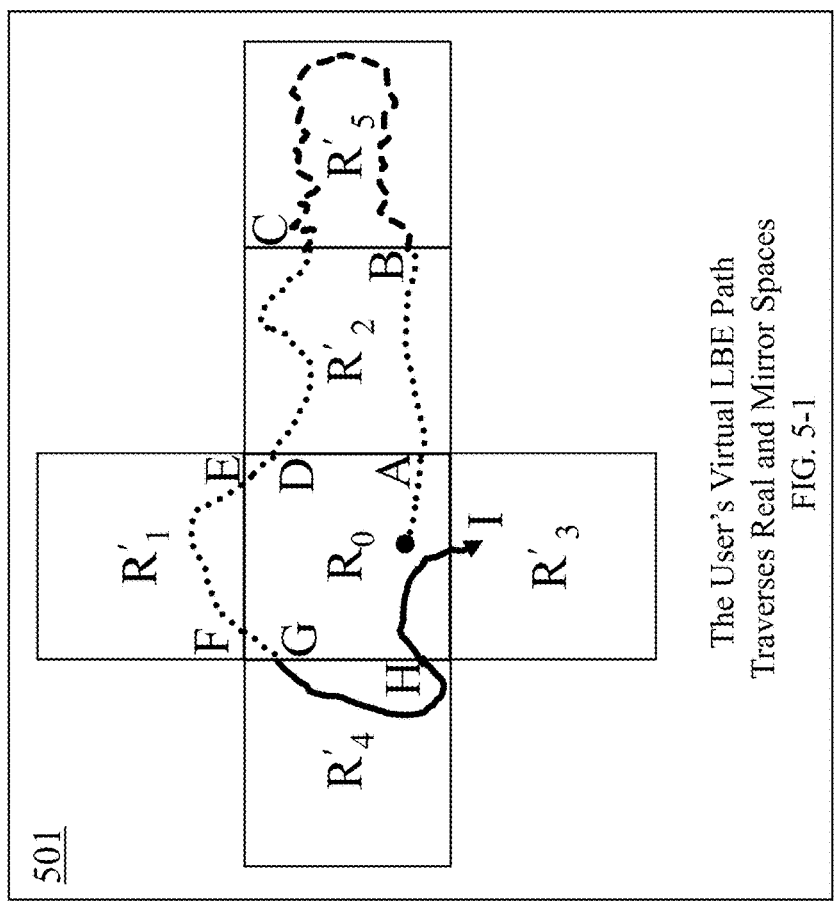

FIG. 5 is an extended example of how mirror spaces may work.

In this case the criteria for constructing a virtual space do not require a specific polygonal shape like 301d. Instead, we only wish to create a Virtual Space 501 with a given area that is 6 times the size of the area of the Real Space 502.

Think for example of an Easter Egg Hunt, where the exact shape of the perimeter is rarely of interest, as long as there is some well-defined polygonal boundary and a reasonably sized total area where the eggs aren't too close together or too far apart.

So, let's say that the desired size for Virtual Space 501 is 600 square meters, the exact shape being irrelevant, and that Real Space 502 is only 110 square meters. How might an algorithm create the mirror spaces?

In 501, $R_0$ is a real space, and a cross-shaped virtual space has been constructed from $R_0$ and mirror spaces $R'_1$, $R'_2$, $R'_3$, $R'_4$, and $R'_5$.

The user's Real-world Path 502 shows how the user's path through the Virtual Space 501 is actually traversed in the Real-world 502.

In both Virtual Space 501 and Real Space 502 the user begins in $R_0$ and heads east to Point A.

In the Real Space 502, the user must turn around at Point A, which is on the flip line, before heading west to Point B. This causes the user to simply keep going eastwards in the Virtual Space 501.

Then, in the Real Space 502, the user must turn around at Point B, which is on the flip line, before heading to Point C. In the Virtual Space 501 the user simply keeps going east. Notice that this time there's a "double flip".

Traversing from B to C, the user is heading eastwards in both the Real Space 502 and Virtual Space 501.

Similarly, the user flips at points C, D, E, F, G, and H, and arrives at I.

Note, although $R'_1$ mirrors the entirety of $R_0$, that is not necessarily required. For example, if the desired total area of the virtual space were only 150% the size of $R_0$, perhaps the flip line at the top of $R_0$ would mirror only 50% of $R_0$, creating a combined space $R_0+R'_1$ of 150%. Or, in another example, for some optimization purpose the virtual space mapped to $R_0$ could be restricted to 75% of $R_0$, of any shape fitting entirely inside of $R_0$, but then all of that 75% would be reflected in $R'_1$, again creating a virtual space of 150% the size of $R_0$.

An Attempt to Mirror a Real Space Fails

Figure 6:
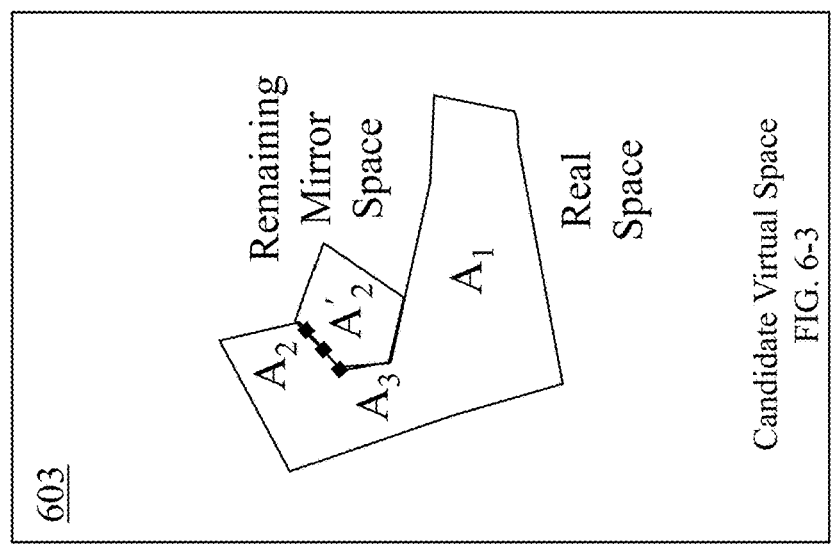
FIG. 6 shows a suboptimal mirroring of a real space, to be avoided.
Figure 6:
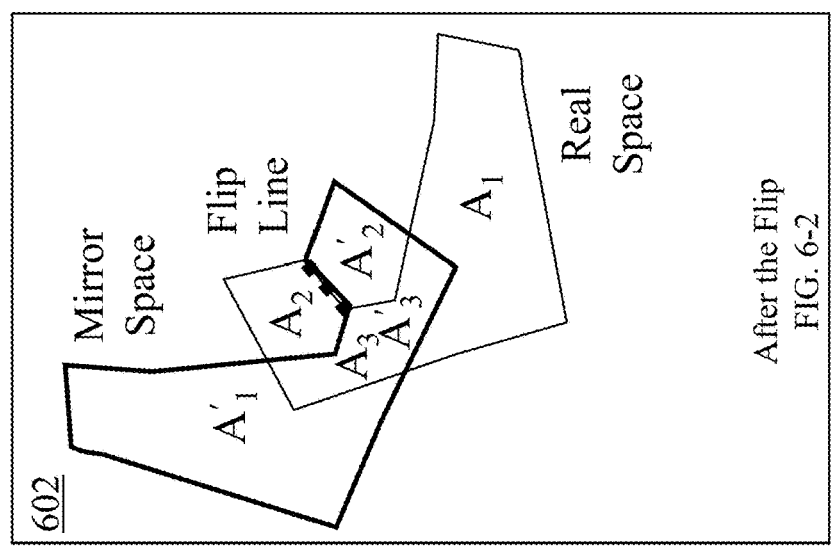
Figure 6:
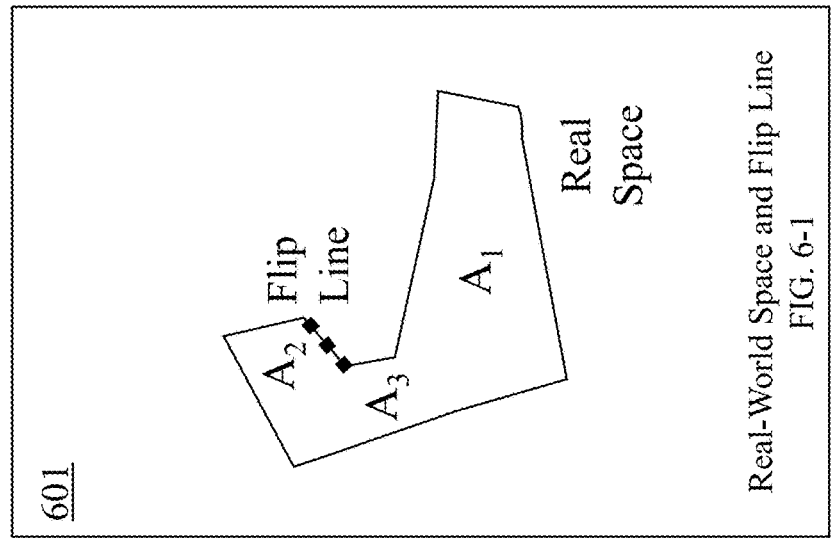

FIG. 6 shows an example of how a real space can be mirrored in a way that is suboptimal, a way to be avoided.

We wish to extend the effective size of Real Space 601 to create a larger virtual space with double the area. We decide to mirror Real Space 601 around the dotted flip line.

The Real Space 601 is composed of $A_1$, $A_2$, and $A_3$. The Mirror Space 602 created by the flip line 601 is composed of $A'_1$, $A'_2$, and $A'_3$ 602.

Note that the Candidate Virtual Space 602, which is the composite of both Mirror Space 602 and Real Space 602, and which therefore includes $A_1$, $A_2$, $A_3$, $A'_1$, $A'_2$, and $A'_3$, is malformed. $A_3$ and $A'_3$ overlap, which is not possible in a flat, contiguous virtual space. (In this example, we are not seeking to divide up the virtual space.)

Thus, we must exclude $A'_3$ from the virtual space. And having done that, now $A'_1$ is inaccessible. Notice in 602 that, with $A'_3$ missing, there is no way to traverse from $A_1$ to $A'_1$ by way of the flip line. The user can move from $A_1$ to $A_3$ to $A_2$ and cross the flip line to $A'_2$, but with $A'_3$ gone, $A'_1$ is an island. It is inaccessible.

Thus, the contiguous, accessible Candidate Virtual Space 603 that remains after choosing the flip line in 601 is merely $A_1$, $A_2$, $A_3$, and $A'_2$ 603, hardly a doubling of the area of the original Real Space 601. We should have chosen our flip line more wisely.

Choosing a Better Flip Line

Figure 7:
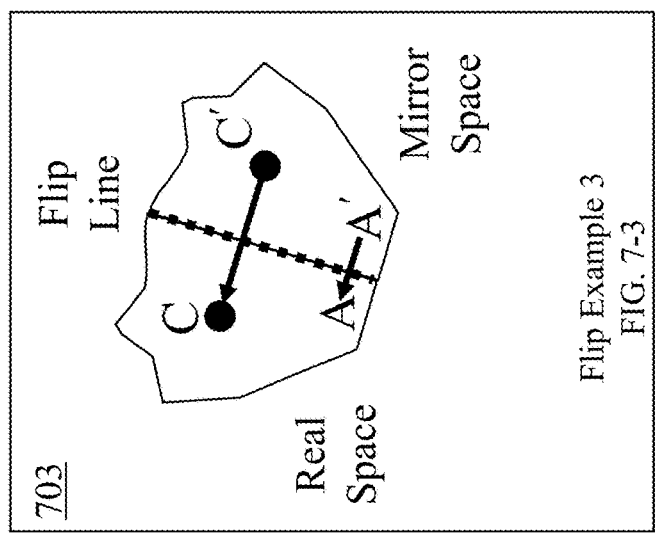
FIG. 7 shows the tradeoffs between different ways to mirror a given real space.
Figure 7:
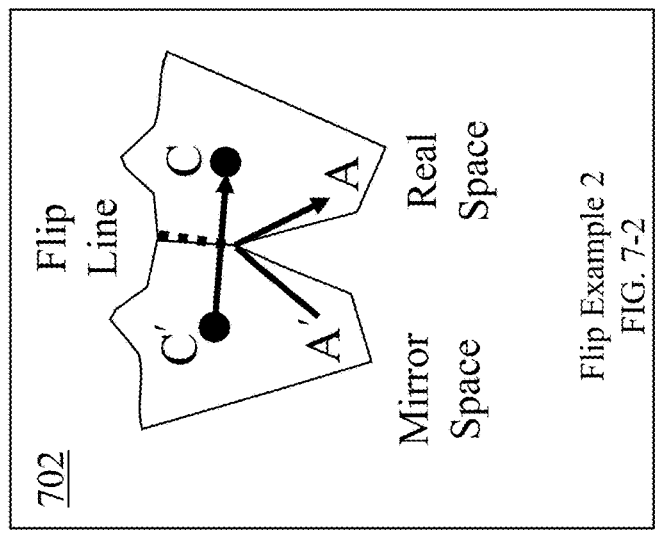
Figure 7:
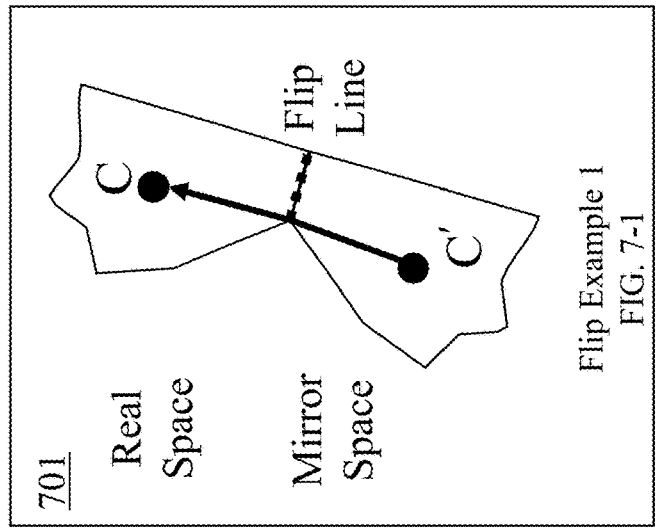

FIG. 7 shows the tradeoffs between different ways to mirror a real space.

Each of the three examples 701, 702, and 703 show ways to mirror an original Real Space 701. However, the three chosen flip lines are not equally optimal.

In Flip Example 1 701, the flip line places the point C, the central point or "centroid" of the real space, too far from its mirror point C'. Like an airport terminal that is elongated instead of circular, the user would spend too much time traversing back and forth between the relatively distant Real Space 701 and Mirror Space 701, even though they are connected.

In Flip Example 2 702, real space centroid C is much closer to mirror space centroid C'. A user will thus do a lot less walking, a desirable optimization.

However, notice in Flip Example 2 702 that the path from A' to A remains a long one, because the user must detour up and out of the way to reach the flip line. The flip line is too short and placed too much towards the top instead of being central.

In Flip Example 3 703, centroids C and C' are just as close as in Flip Example 2 702, but in Flip Example 3 703, the flip line is wider and central to the resulting candidate virtual space. The user does not need to go far out the way to get from A' to A. It is a shorter, straight path. That is also a desirable optimization.

Optimization Problem

Figure 8:
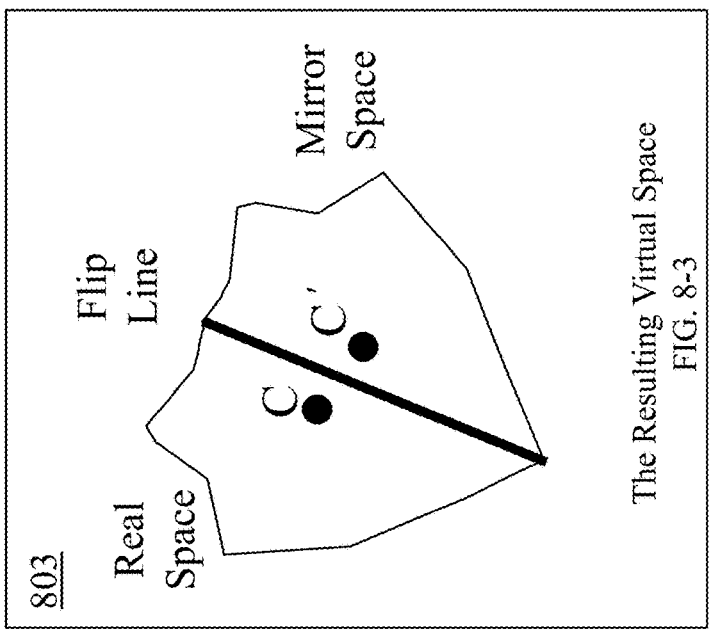
FIG. 8 shows how a real space need not be mirrored from its perimeter.
Figure 8:
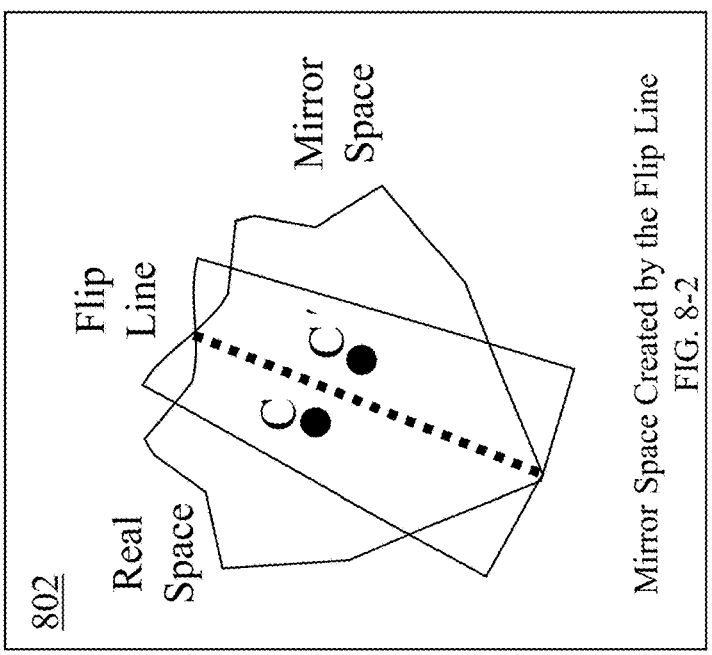
Figure 8:
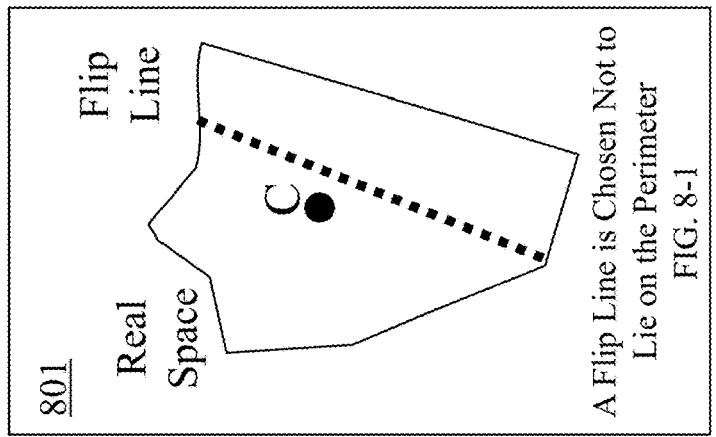

Thus, we are seeking an algorithm that, given some real space, chooses a flip line or flip lines, which may or may not lie on the polygonal sides of the real space, thus creating a flat, contiguous virtual space, to optimize the following factors:
 a) A resulting virtual space with a desired total area
 b) For each user, minimizes the total number of flips, thus reducing possible user annoyance or confusion
 c) For each user, minimizes the average length of a user walk from point to point in the virtual space, via a method that could include but is not restricted to:
   a. Choosing longer flip line(s)
   b. Choosing flip line(s) more central to the resulting virtual space
   c. Keeping the centroids of the real space and mirror space(s) closer An Example Flip Line that does not Lie on the Perimeter In FIG. 8, let's say that the area of Real Space 801 is 110 square meters, and that the intended size of the resulting virtual space is only 150 square meters. So, the Real Space 801 does not need to be doubled, only increased 50%.

Notice that A Flip Line is Chosen Not to Lie on the Perimeter 801 of the real space. The Flip Line 901a is not one of the polygonal sides of the Real Space 801.

This creates a Mirror Space 802.

Adding together the Real Space 802 and Mirror Space 802, while removing their overlap, results in Candidate Virtual Space 803.

Although Candidate Virtual Space 803 does not double the Real Space 801, perhaps in this example the intended virtual space does not need to be exactly twice the size of the Real Space 801.

And this Flip Lines 801 better fits optimization criteria than using an edge of the Real Space 801 polygon for a flip line. For example, look how wide the flip line is 803, how central the flip line is 803, and how close together the centroids C and C' are 803.

So, choosing a flip line that is not a polygonal side of Real Space 801 can be a solution if either:
 a) A full doubling of the area of Real Space 801 is not required, or
 b) A full doubling is required but could be more optimally achieved by this flip line to extend the space and then adding a second flip line to further extend the space.

Finally, if the area of Candidate Virtual Space 803 produced by the chosen flip line is still larger than needed, we could reduce portions of the polygonal space, as shown in 1606 and 1607.

Coordinating Users in Different Locations

Figure 9A:
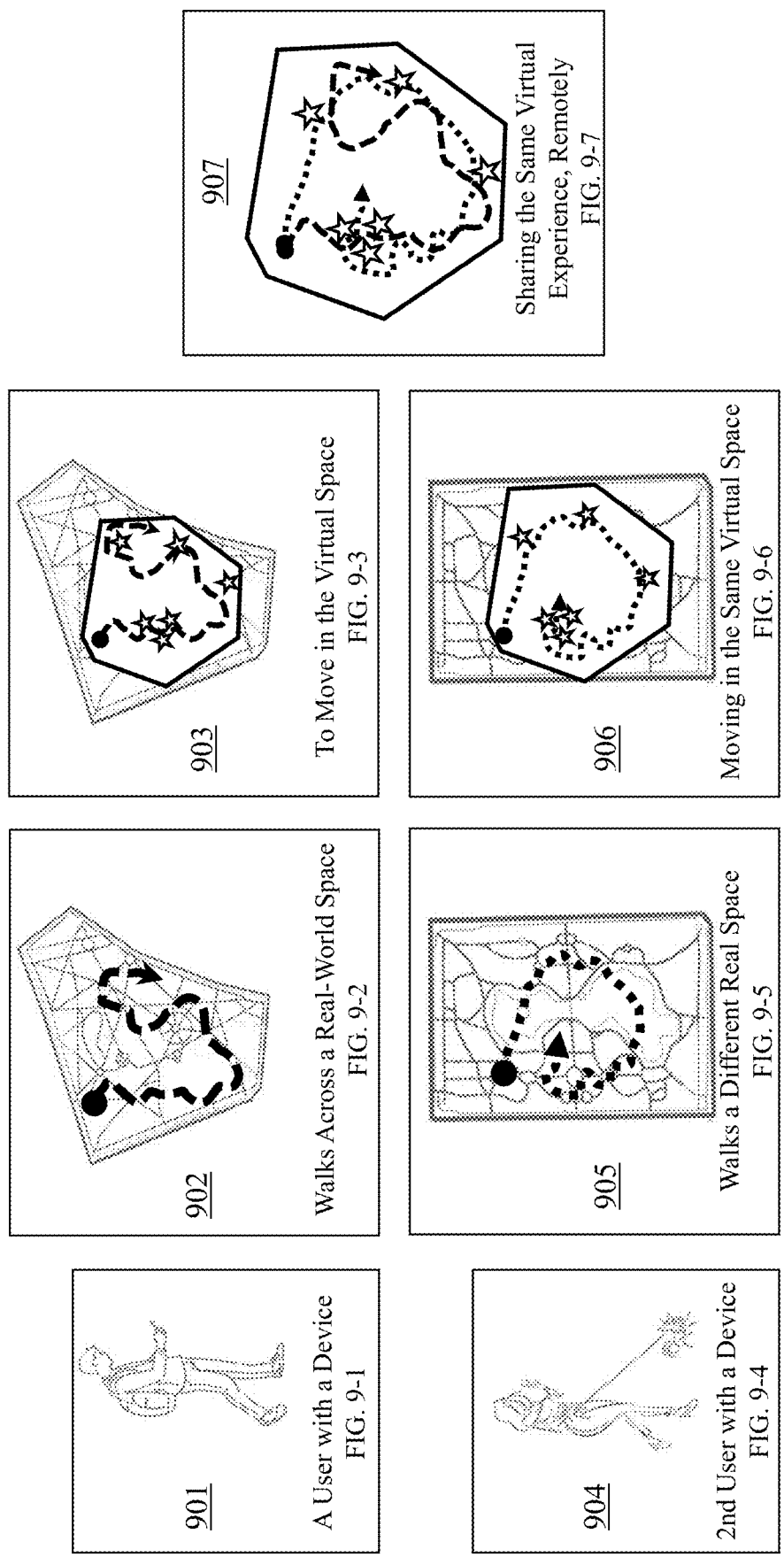
FIG. 9a shows users in different physical spaces sharing one virtual experience.

FIG. 9a shows a desired use case, two users in two different map locations sharing a single virtual experience.

Similar to FIG. 1, in FIG. 9a User 901 has a mobile device, personal computer, or some other data processor. User 901 walks through a Real Space 902, which moves his virtual location through the Virtual Space 903.

However, in this case, a Second User 904, who walks through a different Real Space 905, also wants to experience the Location-Based Experience made possible by virtual space. The same Virtual Space 903 is laid out now 906 in the Second User 904's Real Space 906. It must be a single Virtual Space 907, because giving two users differently shaped Virtual Spaces would result in discontinuities, meaning that as User 901 moves around, Second User 904 would sometimes see him "teleport" from one location in the virtual space to another.

Thus, User 901 and Second User 904 can have either:
 Two virtual spaces, identical and giving identical experience, separately.
 A single virtual space that is shared in real time, such as a race to collect as many Easter Eggs as you can, before the other user gets to them first.
 A single virtual space that is shared, but not in real time.

Of course, there could be many more than just two users coordinated in this way. Each user's Real Space 902 and 905 could have differently placed flip lines, and thus differently placed mirror spaces, as long as there is only one resulting Virtual Space 907, with a single shape that fits inside each of the Real Spaces 902 and 905.

Adjusting for Users with Different Walking Speeds

FIG. 9b shows how a modification to handle users with different speeds.

For example, Faster Speed User 908 wishes to share an LBE with Slower Speed User 909, who will travel a shorter physical distance in a given time period 910.

We can normalize their speeds by reducing the size of the virtual space 911 presented to Slower Speed User 909's real space 913. Thus, Slower Speed User 909 will be traverse the virtual space at the same rate as Faster Speed User 908, despite physically moving slower, because Faster Speed User 908 will have to travel farther physical distances to travel the same distance as Slower Speed User 909 in their respective virtual spaces 912 and 913.

To implement this, we adjust any of the algorithms in the same manner:
 Artificially increase by some factor $F_1$ the size of a Real Space that is given to the algorithm for a slower than average user.
 Artificially decrease by some factor $F_2$ the size of a Real Space that is given to the algorithm for a faster than average user.
 This will result in a single virtual space of a single virtual size, but one that is correlated with an oversized real world space (for slower users) or undersized real world space (for faster users)
 Therefore, when correlating the virtual space to the actual, real world map coordinates, scale down the resulting virtual space by a factor of $F_1$ for the slower user and scale up the resulting virtual space by a factor of $F_2$ for the faster user.

Three Algorithms

Figure 17:
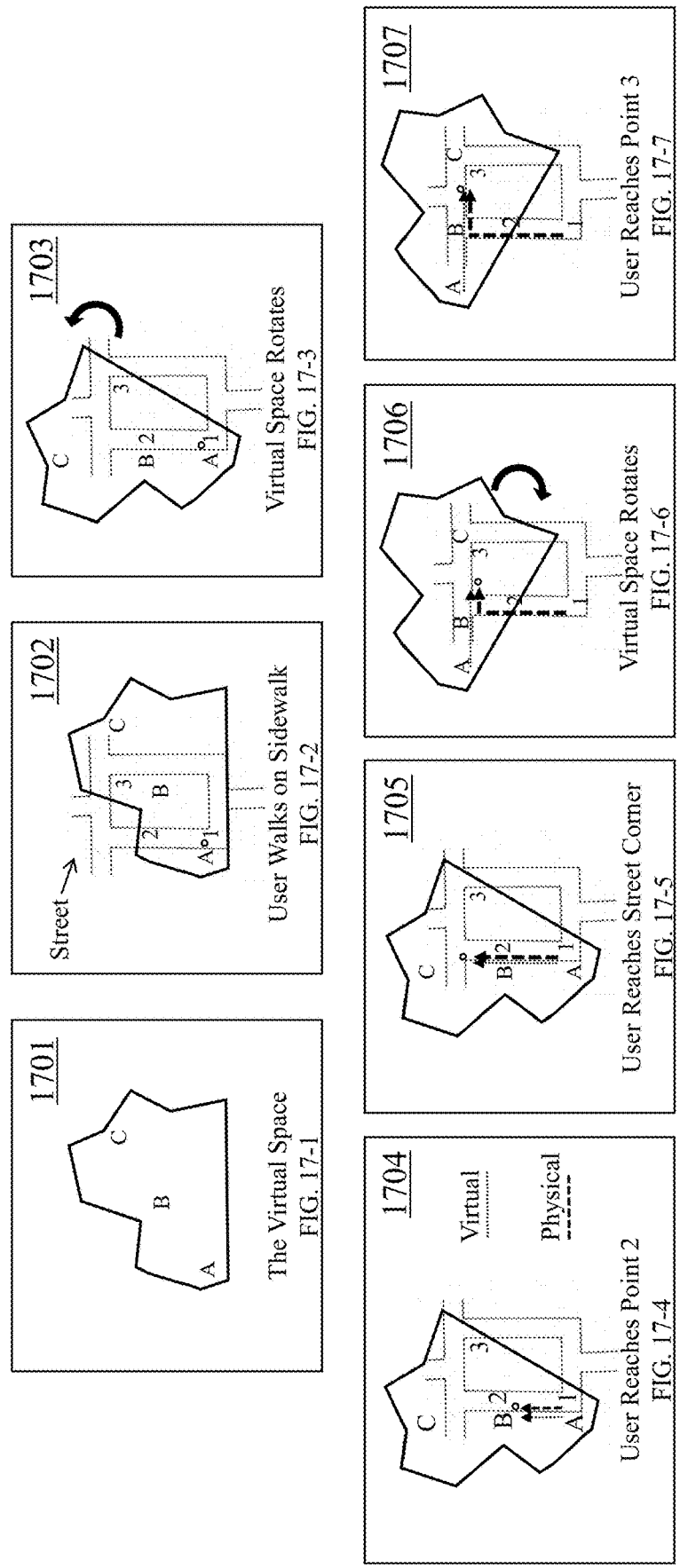
FIG. 17 is Algorithm 3, placing a 2D virtual space onto real 1D sidewalks.

Three preferred embodiments follow:
 Algorithm 1 for the case where the resulting virtual space must have a fixed shape, as shown in FIG. 9a
 Algorithm 2 for the case where the resulting virtual space can have an arbitrary shape as long as it has the desired total target area, as shown in FIG. 13.
 Algorithm 3 for when a two-dimensional virtual space must be mapped to a one-dimensional real-world environment such as a long city sidewalk, as shown in FIG. 17.

Algorithm 1: A Virtual Space with a Desired Fixed Shape

When the virtual space to be created must have a fixed shape and size, there is nothing to optimize between N different users in N different real spaces. Thus, applying the virtual space to each of the N real spaces may be done independently. Each of the N real spaces may be mapped with completely different flip lines to accommodate the virtual space with a fixed shape and size.

A preferred embodiment could include the following algorithm.
 1. Given: A Desired Virtual Space V, a polygon of $N_v$ sides defined by an array of X, Y coordinates V[0] . . . V[$N_v$−1].

2. Given: A Real Space R, a polygon of $N_r$ sides defined by an array of map coordinates R[0] ... R[$N_r$−1].
3. For mathematical simplicity, convert R's map coordinates from geographic latitude, longitude fitting the curve of the Earth into a flat and normalized X, Y coordinate system.
4. Create a Candidate Virtual Space $C_0$, defined as an array of spaces of any type (either the original real space, some mirror extension, a mirror extension to a mirror extension, etc.). Initialize this to just one element, $C_0$[0]=Real Space R.
5. A flip line, which creates a mirror space, implies a growth of R to a larger size. Perform a search through the many ways to grow R. For example, what follows is a breadth-first algorithm, which would tend to minimize the number of total flip lines in the final solution.
6. Thusly:
   a. X=0
   b. For each element Y of $C_x$:
      i. Try to fit V within $C_x$[Y], using the below algorithm "Fit a Virtual Space into a Candidate Virtual Space."
   c. Having exhaustively gone through all elements of $C_x$, if no fit was found, then for each element Y in $C_x$:
      i. Give $C_x$ [Y] to the algorithm "Make an Array of New Candidate Virtual Spaces" below, which returns an array $C_{x+1}$ of all possible expansion spaces that result from adding a single mirror space, in different ways, to each element of $C_x$. $C_{x+1}$ has been sorted from best to worst expansion space.
      ii. Set x=x+1. Recurse to step 6b with the new $C_x$.

Fit a Virtual Space into a Candidate Virtual Space
1. Given: Desired Virtual Space V and Candidate Virtual Space C as polygons.
2. Find the optimal fit of V and C through some method such as random-restart hill climbing or a brute force random approach. Translate and rotate V as needed, and optionally (if given as an option in the input criteria), flipping it over or scaling it within some target range. Optimize the fit through criteria which could include minimizing the mirror space portions of V and C.
3. Either return a success value and the resulting fit or return a failure value.

Make an Array of New Candidate Virtual Spaces
1. Given an array of candidate virtual spaces $C_x$:
2. Create an empty array of candidate virtual spaces, $C_{x+1}$
3. For every $C_x$[Y] in the array $C_x$:
   a. For A increments from 0 to length($C_x$[Y])−2
      i. For B increments from A+1 to length($C_x$[Y])−1
         1. Make a flip line F from $C_x$[Y][A] to $C_x$[Y][B]
         2. Skip F if it falls entirely outside of the polygon $C_x$[Y] (e.g., from tip to tip of the letter U)
         3. Skip flip lines that have already been tried previously in the recursion stack
         4. Calculate the resulting candidate virtual space $C_{new}$ as $C_x$[Y] plus the new Mirror Space polygon created by the flip line
         5. Remove overlap areas from $C_{new}$ (see FIG. 5)
         6. If $C_{new}$ is no longer a contiguous polygon, due to some inaccessible area (see FIG. 5), throw out the smallest piece(s), leaving $C_{new}$ a single, contiguous polygon
         7. Recalculate the centroids of $C_x$[Y] and the new mirror space that was just added to make $C_{new}$.
         8. Add $C_{new}$ to $C_{x+1}$
4. Sort the elements of $C_{x+1}$ based on a score S, a heuristic of "good choices" that may include:
   a. Choosing longer flip line(s)
   b. Choosing flip line(s) more central to the resulting virtual space
   c. Keeping the centroids of the real space and mirror space(s) closer
5. An optional optimization could include searching for a best flip line, running between R[A] to R[B], and consider flip lines from every point on the polygonal sides from R[A−1] to R[A], and from R[A] to R[A+1], and from R[B−1] to R[B], and from R[B] to R[B+1] as in FIG. 12.

Figure 10:
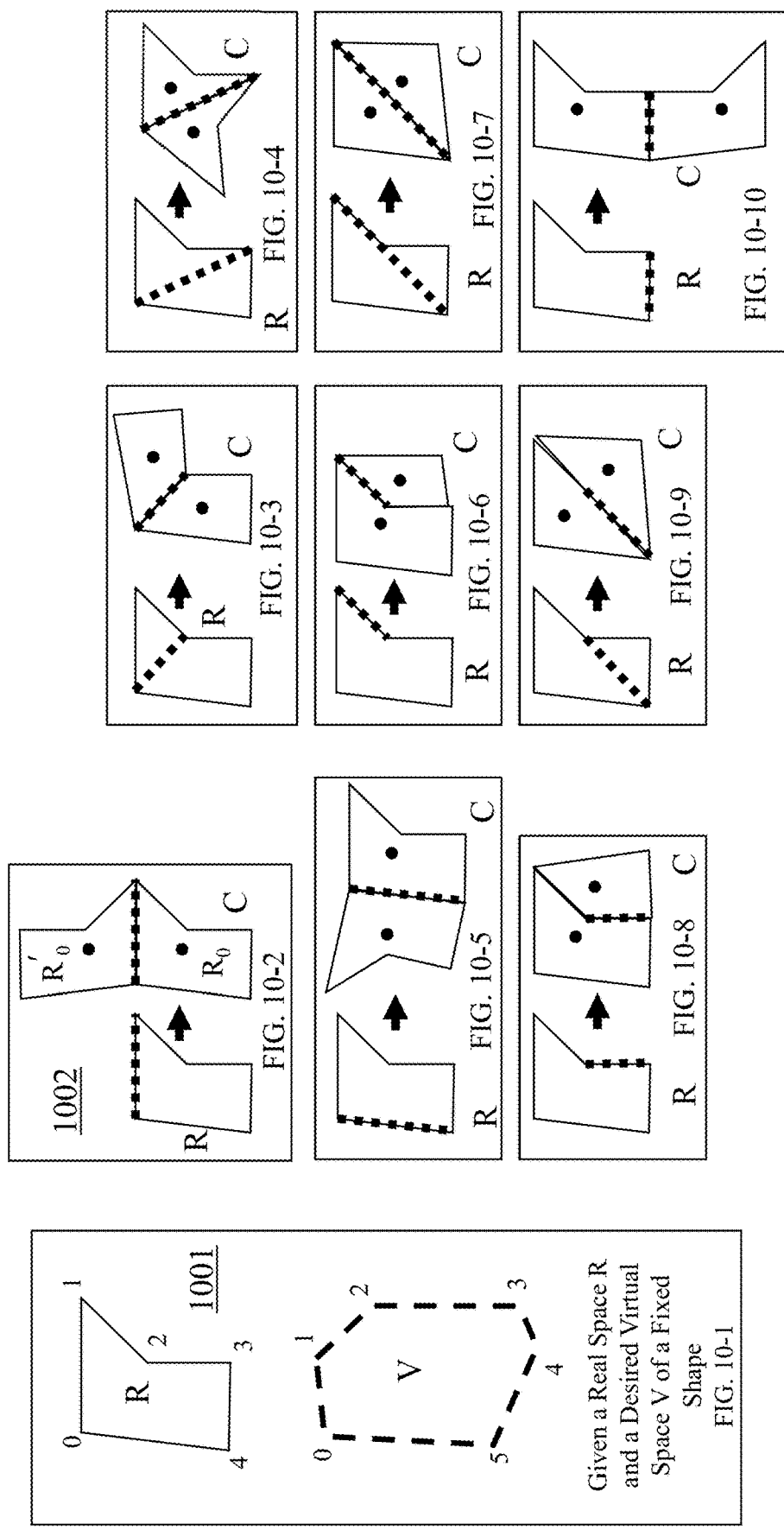
FIG. 10 is Algorithm 1: creating a virtual space with a desired fixed shape.

FIG. 10 shows how parts of this algorithm work. The algorithm begins with input that includes:
   A Real Space R 1001, defined by a polygon, in this case an array of 5 vertices.
   A Desired Virtual Space V 1001, also defined by a polygon, and in this case the algorithm is required to place the Virtual Space V 1001 into the Real Space R 1001 without changing the size or polygonal shape of Virtual Space V 1001.

The algorithm's strategy is to recursively add mirror spaces to Real Space R 1001, to create a Candidate Virtual Space C. For example, 1002 to the left of the arrow shows creating a flip line on Real Space R 1001 from R[0] to R[1].

The resulting Candidate Virtual Space is shown 1002 to the right of the arrow, comprised of two parts: The Real Space $R_0$ at the bottom and the newly created Mirror Space $R'_0$ at the top. The remaining diagrams on FIG. 10 show other ways that mirror spaces can be created from the vertices of Real Space R 1001, with the exception of creating a flip line from R[1] to R[3], which falls entirely outside of the Real Space R's polygon.

All of these expansions, the array of the newly created Candidate Virtual Spaces from 1001 get sorted with some scoring system. Let's say that the Candidate Virtual Space from 1002 has the highest score, and thus comes first in the array.

Figure 11:
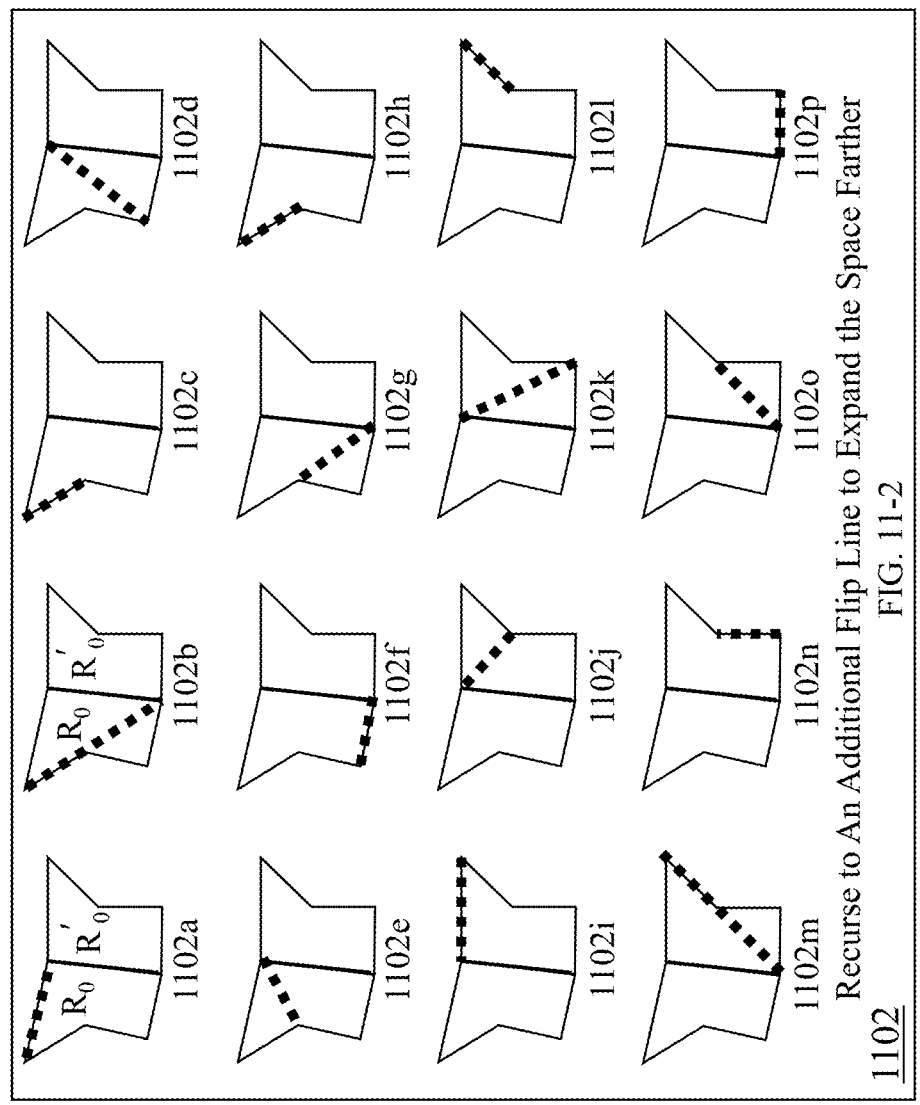
FIG. 11 continues Algorithm 1 recursively.
Figure 11:
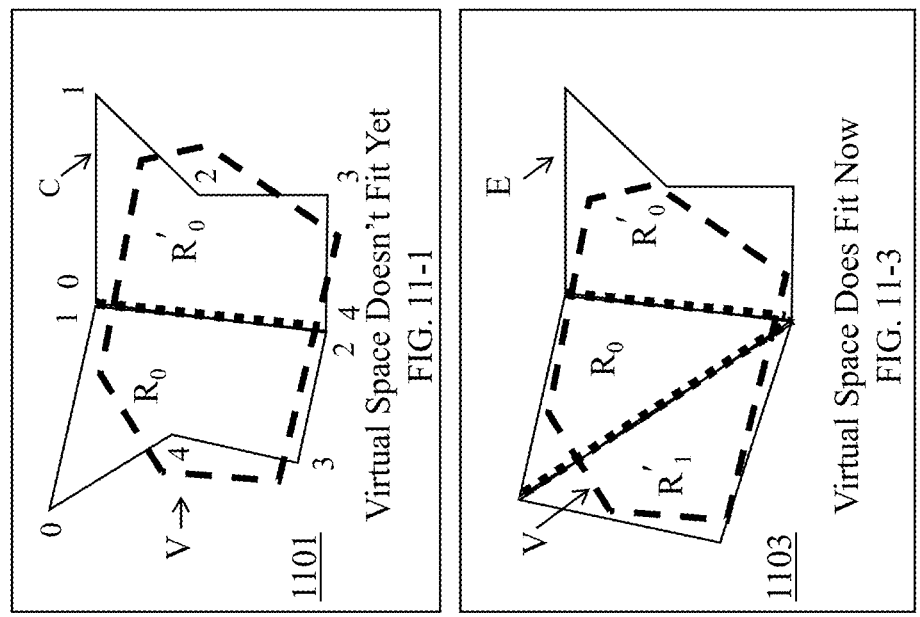

FIG. 11 continues the algorithm.

In 1101, we consider the Candidate Virtual Space C 1101 created in 1002 because it had the highest "good choice" score. Again, C is comprised of the original Real Space $R_0$ from 1001, with vertices numbered from 0 to 4, and the newly created Mirror Space $R'_1$ 1101, with vertices numbered from 0 to 4.

Notice that the original Desired Virtual Space V 1001, which was an input to this algorithm, still does not fit into C 1101, no matter how Desired Virtual Space V 1001 is rotated and translated in 1101. (In this example, the input to the algorithm did not permit flipping or scaling of the Desired Virtual Space V 1001 to make a fit.) So, we must expand C some more.

So, in 1102 the algorithm recurses and expands C again with a second mirror space.

Each example in 1102 shows C before its second expansion. This is the same C from 1002 and 1101, with the original Real Space $R_0$ from 1001 on the left and the newly created Mirror Space $R'_0$ 1101 on the right.

First, the algorithm tries to expand Real Space $R_0$ with a new mirror space.

Starting in 1102a, a flip line is drawn onto C from $R_0$[0] to $R_0$[1]. (Refer to 1101 for the vertex numbers.) Then, in 1102b, a flip line is drawn onto C from $R_0$[0] to $R_0$[2]. This continues through 1102h, though notice that there is no flip line drawn from $R_0$[0] to $R_0$[2], which falls outside of the polygon $R_0$. Also, there is no flip line drawn from $R_0[1]$ to $R_0[2]$ because the flip line created in 1002 is already there.

Next, the algorithm experiments with adding flip lines to Mirror Space $R'_0$. Starting with 1102i, a flip line is added from $R'_0[0]$ to $R'_0[1]$. (Refer to 1101 for the vertex numbers.) Again, a flip line is not drawn where is falls outside the polygon, from $R'_0[1]$ to $R'_0[3]$. Again, a flip line is not drawn where one has previously been placed in the recursive stack, from $R'_0[0]$ to $R'_0[4]$.

Although not drawn, a new Candidate Virtual Space C is created for each of the 16 cases in 1102. The array of these Candidate Virtual Spaces is then sorted again through some scoring system that ranks what seems "best".

Let's say that the Candidate Virtual Space from 1102b is best, and thus first on the array. 1103 shows the Candidate Virtual Space, which is comprised of:
- The original Real Space $R_0$ Space from 1001.
- The Mirror Space $R'_0$ created in the previous recursion, in 1002.
- The Mirror Space $R'_1$ created in the current recursion, in 1102b, by flipping $R_0$ around the flip line from $R_0[0]$ to $R_0[2]$ and removing overlap.

Just as we did in 1101 with the previous recursion stack, in 1103 we compare the newly created Candidate Virtual Space 1103 with the Desired Virtual Space 1103 that was originally input to the algorithm in 1001.

In 1101, the Virtual Space V didn't fit into the Candidate Virtual Space C, and we had to recurse and expand C further. Now, having made that expansion, in 1103 V does fit into C. This solution is chosen. We are done.

FIG. 12 shows how Step 3 of "Make an Array of New Candidate Virtual Spaces" could work, in a preferred embodiment.

In 1201, a flip line is discovered in Real Space R, from R[0] to R[3], making Candidate Virtual Space C.

In 1202, some method, for example, random-restart hill climbing, considers flip lines from all the R[0] to all the polygonal perimeter points between R[3−1] to R[3+1]. Perhaps some more optimal Candidate Virtual Space C can be discovered.

In 1203, the same method is applied to consider flip lines from R[0−1] to R[0+1] to R[3], and in 1204 all the adjacent perimeter points to R[0] and R[3] are considered simultaneously to try new flip lines.

Algorithm 2: A Virtual Space with a Desired Total Area

A preferred embodiment may include the following algorithm.
1. Given: A Desired Virtual Space V, whose shape is not predetermined, but whose total area is desired to be $V_{AREA}$, or within some range $V_{MIN}$ to $V_{MAX}$.
2. Given: An array of Real Spaces RS, with each real space defined by an array of map coordinates R[0] . . . R[$N_r$−1].
3. For mathematical simplicity, convert all the map coordinates in RS from geographic latitude, longitude fitting the curve of the Earth into a flat and normalized X, Y coordinate system.
4. Create an array $CS_0$ Candidate Virtual Spaces, initialized to RS.
5. Set X=0
6. Find the maximal area polygonal intersection IMAX of all the spaces in $CS_x$, through some method such as:
    a. Make a copy CS' of $CS_x$.
    b. Match every space CS'[A] to every other space CS'[B], using the below algorithm "Find the Largest Overlap Between Two Polygons", which returns overlap polygon P.
    c. Replace CS'[A] with P and delete CS'[B].
    d. Iterate until CS' has only one remaining element and return that as IMAX
7. If the area of IMAX is equal to $V_{AREA}$, or within the range $V_{MIN}$ to $V_{MAX}$, that is our solution, return it.
8. Otherwise, if the area of IMAX is larger than $V_{AREA}$ or $V_{MAX}$:
    a. Set the Candidate Virtual Space V=IMAX.
    b. Crop V down to a smaller polygon with area $V_{AREA}$, with some algorithm such as random-restart hill climbing with a circular cropping zone that begins centered at V's centroid, to optimize for criteria which could include:
        i. Reducing the Mirror Space portion of V
        ii. Keep the perimeters of the Virtual Space as close to its centroid as possible, thus reducing how much users must walk.
        iii. Avoid creating a non-contiguous polygon from the cropping.
    c. Return as our solution
9. Otherwise, the area of IMAX is still too small for our desired area $V_{AREA}$ or $V_{MIN}$. So:
    a. Copy $CS_x$ to $CS_{x+1}$.
    b. Set x=x+1.
    c. Consider all flip lines (thus adding a mirror space to expand the space) of every Candidate Virtual Space in $CS_x$, using for example the above algorithm Make an Array of New Candidate Virtual Spaces. Cache the results.
    d. From these results, choose $Mirror_{BEST}$ the best expansion Mirror Space that applies to $CS_x$[BEST], one of the Candidate Virtual Spaces in $CS_x$, based on criteria that may include:
        i. What most expands the area of the intersection between the elements of $CS_x$, which is the Candidate Virtual Space
        ii. Reducing the Mirror Space portion of that intersection vs. the Real Space portion
        iii. Choosing longer flip line(s)
        iv. Choosing flip line(s) more central to the resulting virtual space
        v. Keeping the centroids of the real space and mirror space(s) closer
    e. Expand $CS_x$[BEST] by adding $Mirror_{BEST}$.
    f. Recurse to Step 6, either in a breadth first or depth first manner.

Find the Largest Overlap Between Two Polygons
1. Given: Polygons A and B
2. Find the maximal area overlap of A and B through some method such as starting by matching their centroids and then random-restart hill climbing or a brute force random approach.
    a. Translate and rotate A and B as needed.
    b. Flip over A or B if needed (turning the entire Candidate Virtual Space into a mirror space).
    c. Optionally, if given as an option in the input criteria, scale A or B within some range.
3. Return the overlap polygon and its area.

Figure 14:
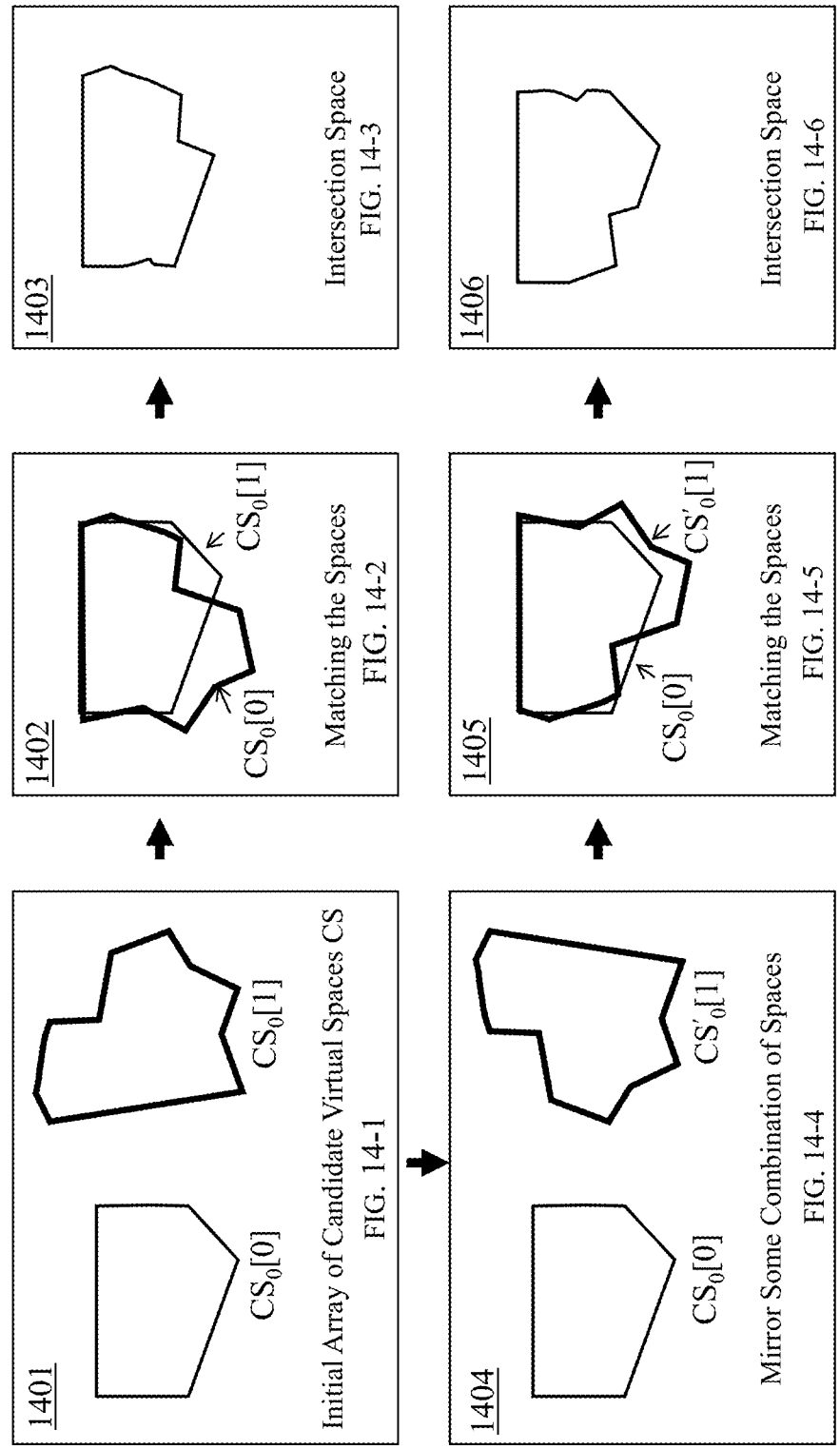
FIG. 14 continues Algorithm 2, needing a single solution for multiple users

FIG. 13 and FIG. 14 show an example of running this algorithm.

As an input, the algorithm takes Real Space $R_0$ 1301, Real Space $R_1$ 1302, and a Desired Area $V_{AREA}$ 1303 of the Virtual Space to be computed. The Virtual Space may have any shape 1304 as long as the area is the right size.

Candidate Virtual Space $CS_0[0]$ and Candidate Virtual Space $CS_0[1]$ 1401 are Matched Together 1402 using rotation and translation to find the Intersection Space 1403 between the two shapes. For example, random-restart hill climbing.

Combinations of mirroring should also be tried, for example flipping $CS_0[1]$ 1404 into $CS'_0[1]$, leading to Match 1405 and Intersection Space 1406, which is slightly larger than 1403.

Intersection Space 1406 is not large enough for the Desired Virtual Space Area 1303, so we recurse into trying flip lines for both $CS_0[0]$ and $CS_0[1]$.

FIG. 15 shows some of the possible flip lines for $CS_0[0]$ and $CS_0[1]$.

Figure 16:
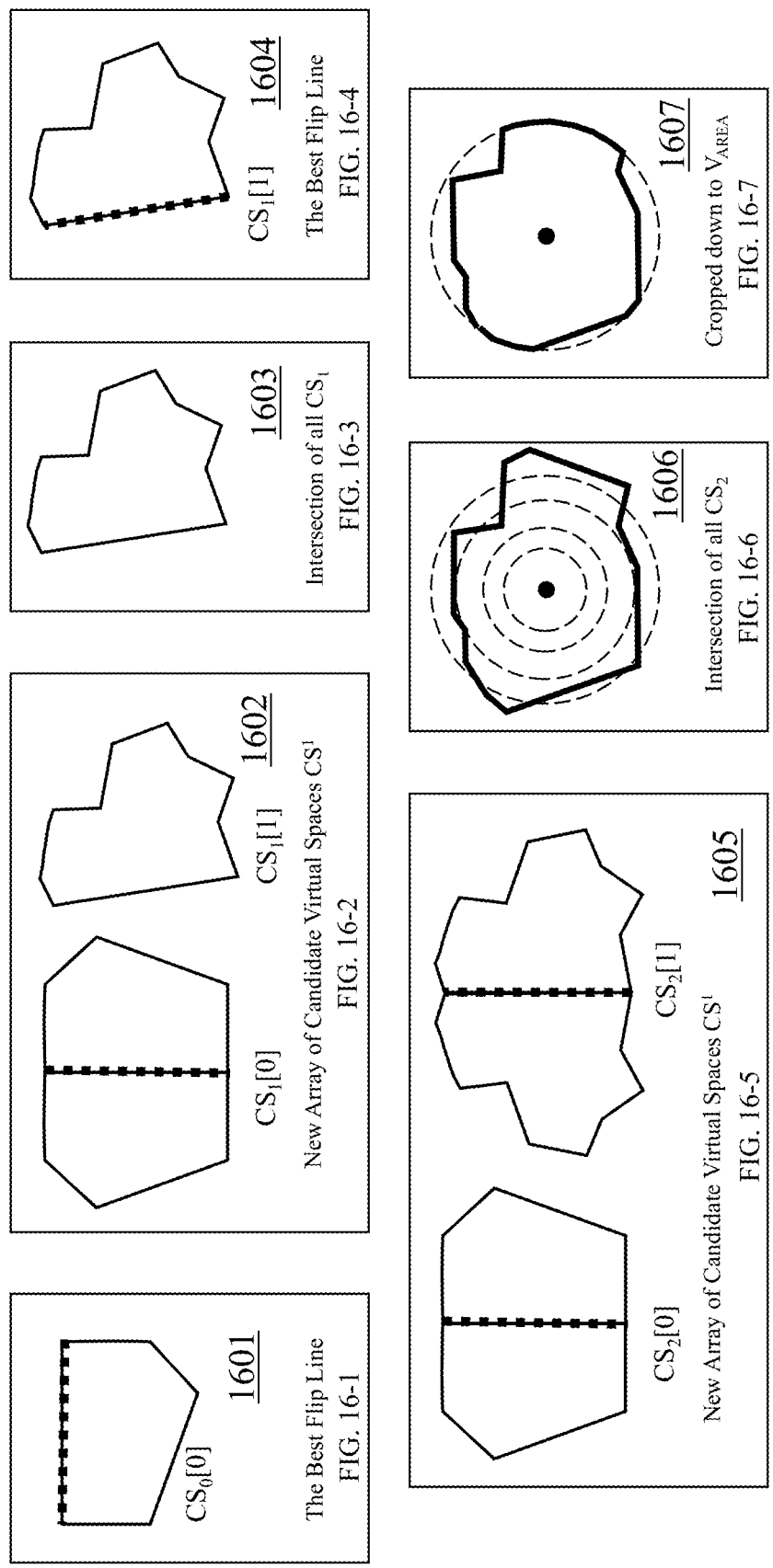
FIG. 16 continues Algorithm 2 recursively and optimizes the final solution.

FIG. 16 shows the best flip lines for the candidate virtual spaces and their intersections.

Using a scoring system, the algorithm chooses the single best flip line 1601 among all of the choices for $CS_0[0]$ or $CS_0[1]$, because it greatly expands the area, but with a wide flip line that keeps the centroids of the real and mirror spaces close together.

That creates a new array of Candidate Virtual Spaces $CS_1[0]$ 1602. Since $CS_1[1]$ fits entirely into the new $CS_1[0]$, clearly the intersection area won't expand unless we next add a mirror space to $CS_1[1]$.

We find the best flip line for $CS_1[1]$ 1604 and generate a new $CS_2$ in which both original real spaces have mirrors $CS_2[0]$ and $CS_2[1]$. We find the intersection 1606 and discover that this is larger than $V_{AREA}$. This intersection is our solution, the constructed Virtual Space.

But, before returning the Virtual Space as the final solution, we use some method such as a random restart hill-climbing algorithm of expanding circles, perhaps beginning centered at the centroid of intersection 1606 to chop the Virtual Space down to exactly an area of $V_{AREA}$ 1607 where each part of the Virtual Space is as close as possible to the centroid.

Algorithm 3: The One-Dimensional Case

FIG. 17 shows the use case of a user experience an LBE while walking along a street or sidewalk.

In this case, a user has a computer device that knows its physical location and displays the virtual space containing the virtual experience. The user is walking along a sidewalk, and their goal is to get from the physical location 1 to the physical location 3. While doing so, the User would also like to travel from point A to point C in the virtual space 1701.

Notice in 1702 that the virtual space is correlated with the real space such that the path through virtual points A, B, and C, which are in a straight line, do not align with the path through physical points 1, 2, and 3, where the user must turn on the sidewalk.

In FIG. 17, a user wants to walk physically from 1 to 2, while walking virtually from point A to point B in the virtual space 1702. Because the user is limited to a one-dimensional movement on the sidewalk, we cannot ask him or her to walk on other compass headings.

Instead, we let the user uses his or her computer device to rotate the virtual space 1703 such that the compass headings of his or her physical and virtual intended direction of travel are aligned. The physical direction in 1703, from 1 to 2, now matches the virtual direction, from A to B in 1703. The user walks to B and to 2 in 1704.

In 1705, the user reaches physical street corner just past location 2 and virtual point B, then decides to turn the corner. The user wants to physically head towards location 3 and simultaneously head towards virtual point C.

So, in 1706 her or she manually rotates the virtual space again to realign the intended virtual path B to C with the intended physical path from 2 to 3. Finally, the User reaches points 3 and C in 1707. Of course, this method could be applied to any network of one-dimensional or narrow lanes of travel, straight or curved.

System Diagram

Figure 18:
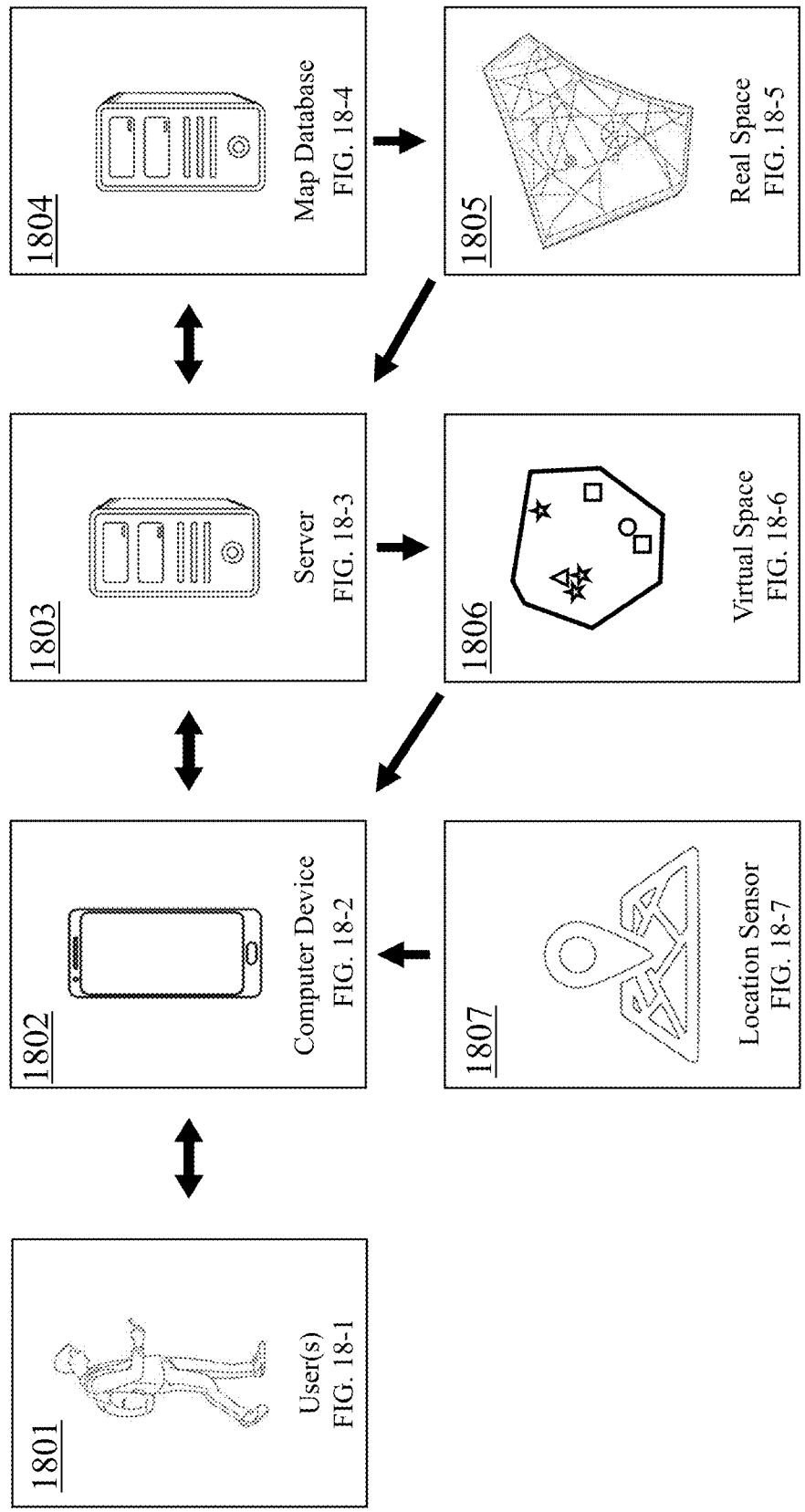
FIG. 18 shows the entire system of a preferred embodiment.

FIG. 18 shows the entire system of a preferred embodiment.

A User 1801 has a Computer Device 1802 that has a Location Sensor 1803 to detect the position of the device, and therefore of the user. There can be multiple Users 1801, each with their own Computer Device 1802 with a Location Sensor 1803.

The Computer Device 1802 transmits this location to the Server 1804, which asks a Map Database 1805 to present some Real Space 1806, near User 1801's location, to Server 1804.

Server 1804 then performs the preferred embodiment, based on given parameters, creating the Virtual Space 1807 that is correlated with the Real Space 1806.

This Virtual Space 1807 is then transmitted to User 1801's Computer Device 1802.

The User 1801, using the Computer Device 1802, can then explore the Real Space 1806, as tracked by the Location Sensor 1803. Every step that User 1801 takes in the Real Space 1806 is correlation with a movement of his or her virtual location inside of the Virtual Space 1807. If there are multiple Users 1801, they have different Real Spaces 1806 but share the same Virtual Space 1807.

Implementation Options

It should be understood that the example embodiments described above are not intended to be exhaustive or limited to the precise form disclosed, and thus may be implemented in many different ways. In some instances, the various data processors including personal computers, tablets, mobile devices and other computers may each be implemented by a separate or shared physical or virtual or cloud-implemented general-purpose computer having or having access to a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a general purpose computer may contain a system bus, where a bus is a set of hardware lines used for data transfer among the components of a computer or processing system. The bus or busses are shared conduit(s) that connect different elements of the computer system (e.g., processor, disk storage, one or more memories, input/output ports, network ports, etc.) that enables the transfer of information between the elements. One or more central processor units are attached to the system bus and provide for the execution of computer instructions. Also attached to system bus are typically device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that may be rapidly provisioned and released with minimal management effort or service provider interaction. Such cloud computing deployments are relevant and typically preferred as they allow multiple users to access computing. By aggregating demand from multiple users in central locations, cloud computing environments may be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block, flow, network and code diagrams and listings may include more or fewer elements, be arranged differently, or be represented differently.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Also, the term "user", as used herein, is intended to be broadly interpreted to include, for example, a computer or data processing system or a human user of a computer or data processing system, unless otherwise stated.

The above description has particularly shown and described example embodiments. However, it will be understood by those skilled in the art that various changes in form and details may be made therein without departing from the legal scope of this patent as encompassed by the appended claims.

It will thus now be apparent that other variations and modifications may be made to the described embodiments, with the attainment of some or all of their advantages. Therefore, it is the object of the appended claims to cover all such variations and modifications as come within the true spirit and scope of the disclosure herein and their equivalents.

What is claimed is:

1. A method of operating an electronic device having an associated user, the method comprising the steps of:
   a) receiving criteria regarding a virtual space, the criteria including:
      i. a desired shape for the virtual space;
      ii. a target range within which the virtual space's total area must fall; and
      iii. specific locations inside the virtual space;
   b) receiving boundary coordinates of a physical space within which the virtual space is to be correlated, such that the physical space has a different shape than the virtual space;
   c) maintaining position data of the electronic device within the physical space responsive to estimates of its respective physical position;
   d) such that the user has an identified location in the virtual space that moves as the user moves in the physical space;
   e) artificially extending the physical space by use of one or more flip lines, the one or more flip lines comprising a geometric boundary in which:
      i. part of the virtual space is mapped onto the physical space;
      ii. part of the virtual space is reflected around the flip lines and then mapped onto the physical space; and
      iii. to advance past the flip line in the virtual space, the user moves to the flip line in the physical space, turns around, and keeps moving; and
   f) artificially extending the physical space such that the virtual space fits inside.

2. The method as in claim 1 further comprising:
   g) operating an other electronic device associated with an other user;
   h) receiving boundary coordinates of an other physical space with which the virtual space is to be correlated, such that each physical space has a different shape and such that each physical space is separately correlated with the virtual space;
   i) maintaining position data of the other electronic device within the other physical space responsive to estimates of the other electronic device's respective physical position;
   j) such that the other user has an identified location in the virtual space that moves as the user moves in the other physical space;
   k) artificially extending the other physical space by use of one or more flip lines, the flip lines comprising a geometric boundary in which:
      i. part of the virtual space is mapped onto the other physical space;
      ii. part of the virtual space is reflected around the flip lines and then mapped onto the other physical space; and
      iii. to advance past the flip line in the virtual space, the other user moves to the flip line in the other physical space, turns around, and keeps moving; and
   l) artificially extending the other physical space such that the virtual space fits inside.

3. The method as in claim 2 further comprising:
identifying two or more possible flip lines for the physical space, each of which implies a candidate virtual space;
prioritizing the candidate virtual spaces using a scoring system;
testing the best candidate virtual space against the desired criteria for the virtual space to be generated; and
if the desired criteria cannot be met, iterate to the next best flip line or recursing in some manner such as breadth-first or depth-first.

4. The method as in claim 2 further comprising:
optimizing characteristics of the virtual space and its correlation with the physical space, based on criteria that include one or more of:
   i. minimizing a distance in the physical space that the user must move to access locations in the resulting correlated virtual space;
   ii. maximizing a portion of the virtual space that can be accessed without the user encountering any flip line; or
   iii. minimizing the total number of flip lines in the solution.

5. The method as in claim 4 further comprising:
identifying two or more possible flip lines for each of the physical spaces, each of which implies a candidate virtual space;
prioritizing the two or more possible flip lines using a scoring system;
testing a resulting best flip line against desired criteria for the virtual space; and
if the desired criteria cannot be met, iterating to the next best flip line or recurse, using breadth-first or depth-first.

6. The method as in claim 5 where only a portion of the physical space is extended by the flip line, to:
give more shape options for optimization; and
reduce the total area of the virtual space, and thus the movement of the user, to a minimum.

7. The method as in claim 1 where one or more users, wishing to walk at a set speed, are given a virtual space of the same shape as the desired shape, at a slightly smaller or bigger size.

8. The method as in claim 1 where two or more users are each associated with an electronic device, and the two or more users share a single virtual space, such as a given user is walking linearly on a path, the method additionally comprising:
enabling the given user to move around the virtual space in any direction by enabling the given user to rotate the virtual space on their electronic device around a view of their current location, and
placing a virtual destination on top of a desired physical destination.

9. The method as in claim 1 further comprising optimizing characteristics of the given shape of the virtual space and its correlation with the physical space, based on criteria that include:
   i. maximizing a portion of the virtual space that can be accessed without the user encountering any flip line; or
   ii. minimizing a total number of flip lines.

* * * * *